(12) United States Patent
Swartz et al.

(10) Patent No.: US 9,841,490 B1
(45) Date of Patent: Dec. 12, 2017

(54) SYSTEM AND METHOD FOR DETECTING MOVEMENT OF A MOBILE ASSET AND CONTROLLING OPERATIONS OF THE ASSET BASED ON ITS MOVEMENT

(71) Applicant: BOOZ ALLEN HAMILTON INC., McLean, VI (US)

(72) Inventors: John C. Swartz, Durham, NC (US); Anthony Hefner, Louisburg, NC (US); Charles W. Richards, IV, Cary, NC (US); Gary Jason Myers, Fairfax, VA (US); Matthias Welsh, Washington, DC (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 15/408,055

(22) Filed: Jan. 17, 2017

(51) Int. Cl.
*G01S 3/02* (2006.01)
*G01S 5/02* (2010.01)
(Continued)

(52) U.S. Cl.
CPC ............ *G01S 5/0252* (2013.01); *G01S 13/75* (2013.01); *G01S 13/825* (2013.01); *G06K 7/10366* (2013.01)

(58) Field of Classification Search
CPC .......... G01S 3/02; G01S 5/0252; G01S 13/75; G06K 13/825; G06K 7/10366
(Continued)

(56) References Cited

U.S. PATENT DOCUMENTS 5,517,194 A 5/1996 Carroll et al.
5,874,902 A 2/1999 Heinrich et al.
(Continued)

FOREIGN PATENT DOCUMENTS

| KR | 10-1246343 | 3/2013 |
|---|---|---|
| WO | WO 2014063082 | 4/2014 |

OTHER PUBLICATIONS

Notification of Transmittal of the International Search Report (Forms PCT/ISA/220 and Forms PCT/ISA/210) and the Written Opinion of the International Searching Authority (Forms PCT/ISA/237) dated Jan. 4, 2016, by the Korean Intellectual Property Office in International Application No. PCT/US2015/050928, which relates to U.S. 2016/0088432. (10 pgs).

*Primary Examiner* — Harry Liu
(74) *Attorney, Agent, or Firm* — Buchanan Ingersoll & Rooney PC

(57) ABSTRACT

A system and method are provided for detecting direction of movement. The system includes at least two radio frequency identification (RFID) readers arranged in different locations. The RFID readers transmit respective location signals from their locations and receive corresponding response signals from a portable electronic device (PED) when the PED is within range to receive the corresponding location signals, respectively. The system includes a controller configured to determine whether the individual response signals received by the RFID readers respectively satisfy a predetermined condition at a first time and a second time subsequent to the first time. The controller is also configured to determine a direction of movement of the portable electronic device relative to the locations of the RFID readers during the first and second times based on whether the response signals respectively satisfy the predetermined condition at the first and second times.

28 Claims, 14 Drawing Sheets

(51) Int. Cl.
 *G06K 7/10* (2006.01)
 *G01S 13/75* (2006.01)
 *G01S 13/82* (2006.01)

(58) Field of Classification Search
 USPC .......................................................... 342/463
 See application file for complete search history.

(56) References Cited

U.S. PATENT DOCUMENTS

| | | |
|---|---|---|
| 8,618,913 B1 | 12/2013 | Bailey et al. |
| 2004/0263319 A1 | 12/2004 | Huomo |
| 2005/0037707 A1 | 2/2005 | Lewis |
| 2005/0206353 A1 | 9/2005 | Sengoku |
| 2006/0072787 A1* | 4/2006 | Claudatos ............ G06Q 20/203 382/103 |
| 2006/0107307 A1 | 5/2006 | Knox et al. |
| 2006/0132304 A1 | 6/2006 | Cabell |
| 2008/0204199 A1 | 8/2008 | Howarth et al. |
| 2009/0147025 A1* | 6/2009 | Grigsby ............. A63B 24/0021 345/633 |
| 2009/0210940 A1 | 8/2009 | Dean |
| 2010/0011211 A1 | 1/2010 | Anemikos et al. |
| 2011/0050421 A1* | 3/2011 | Duron ................... G01S 13/589 340/572.1 |
| 2011/0241844 A1 | 10/2011 | Wolf |
| 2013/0293355 A1* | 11/2013 | Christopher ....... G06K 7/10376 340/10.1 |
| 2016/0088432 A1 | 3/2016 | Myers et al. |
| 2016/0240067 A1* | 8/2016 | London .............. G08B 21/0261 |

\* cited by examiner

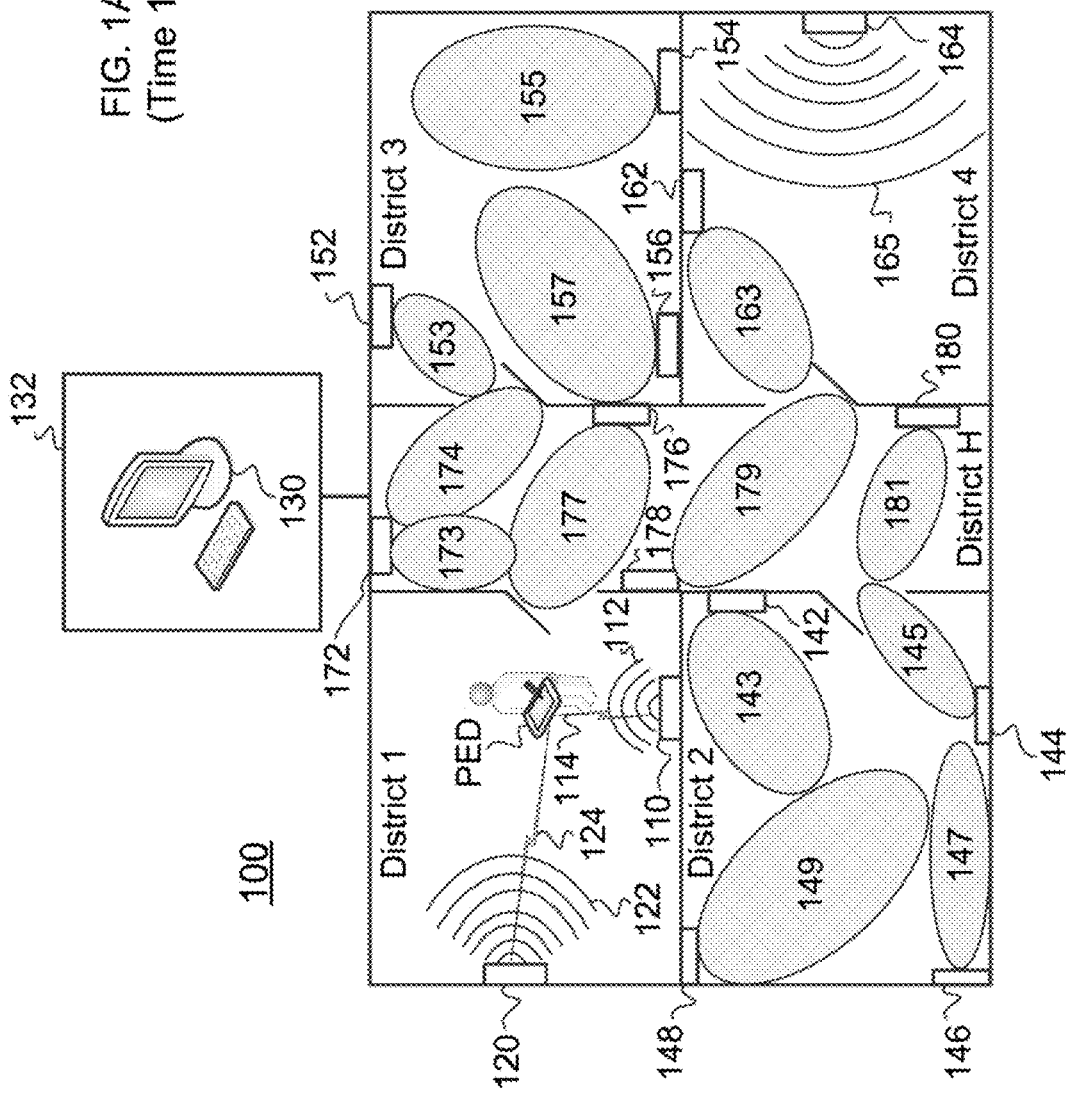

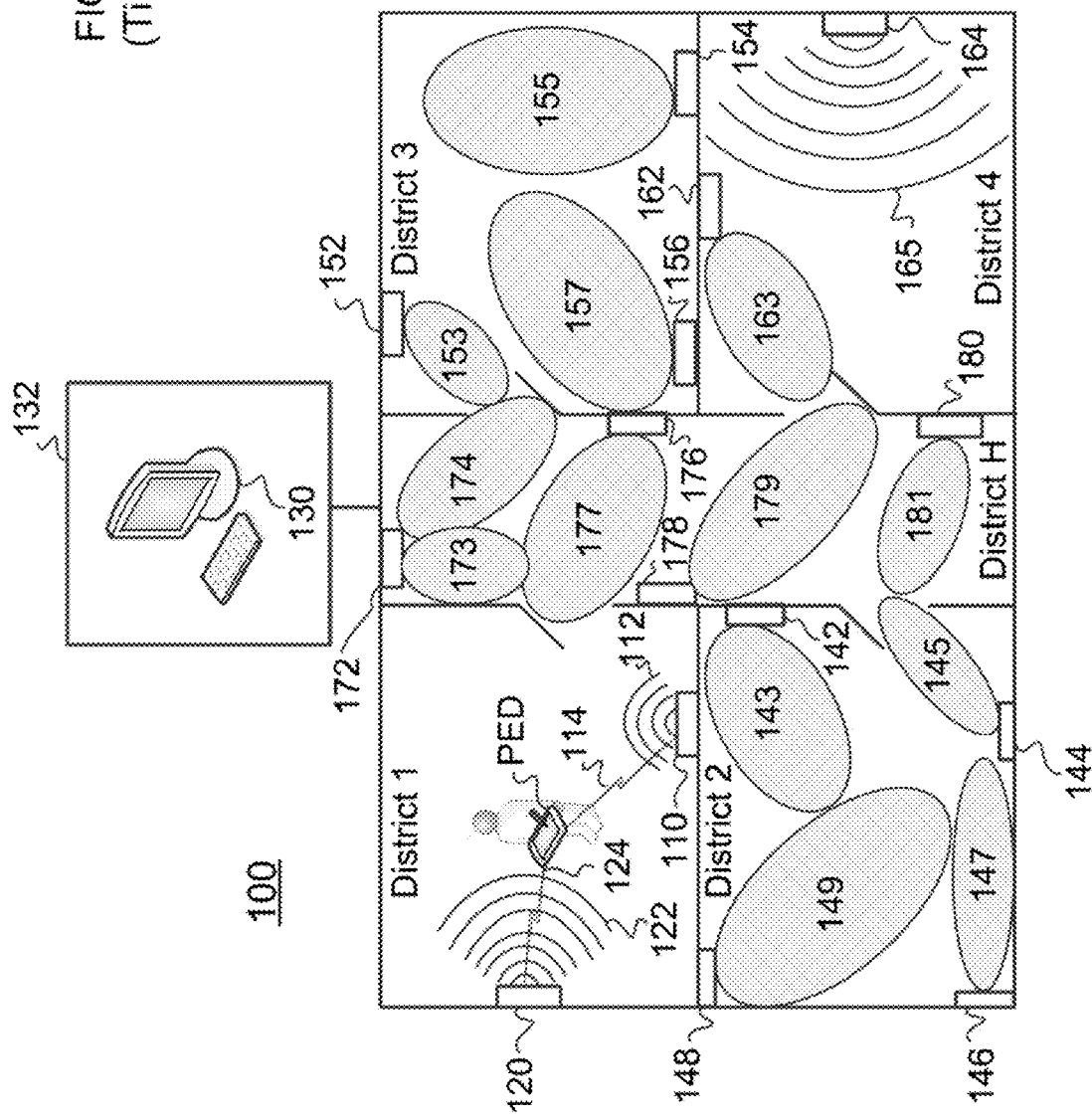

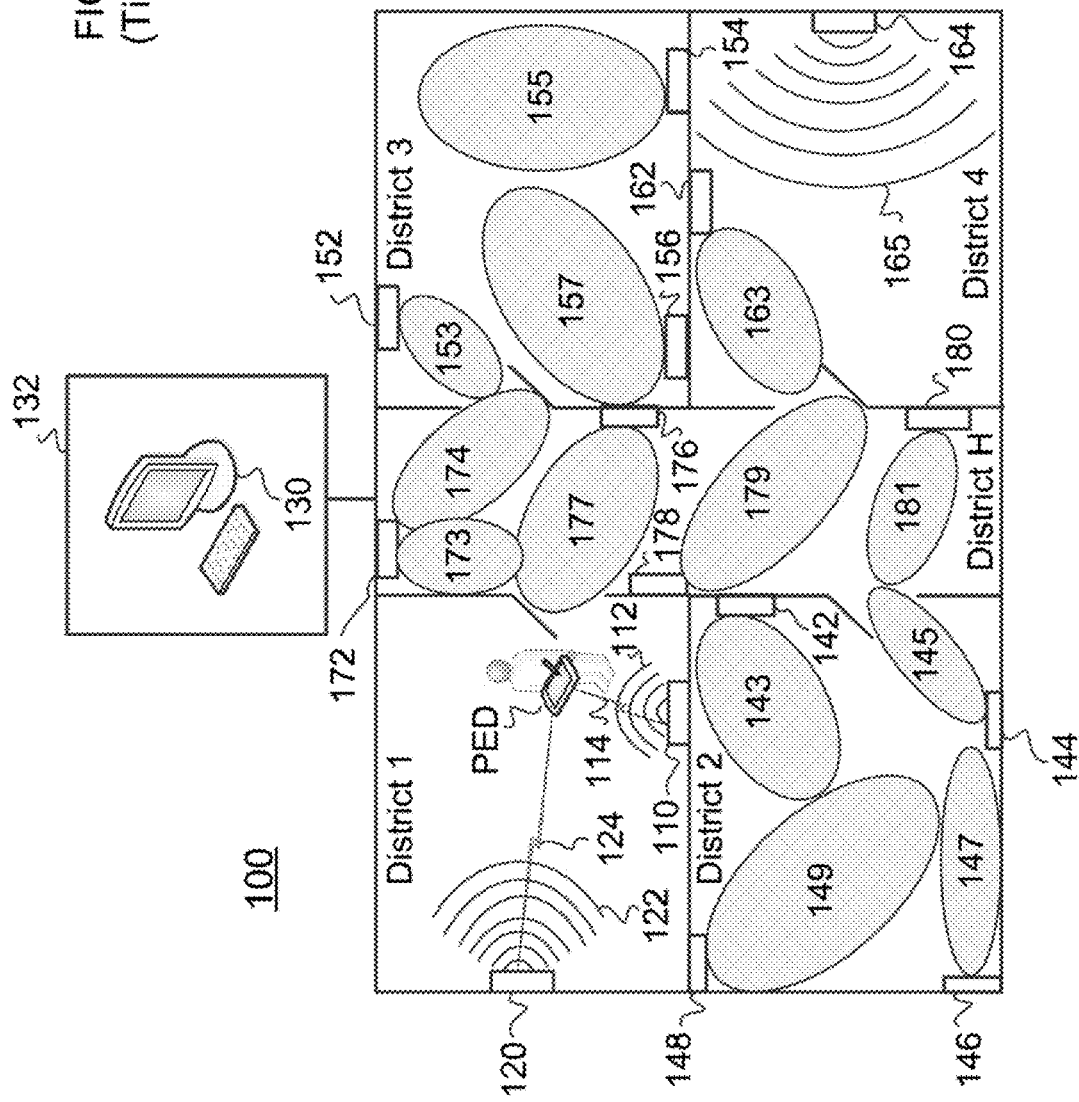

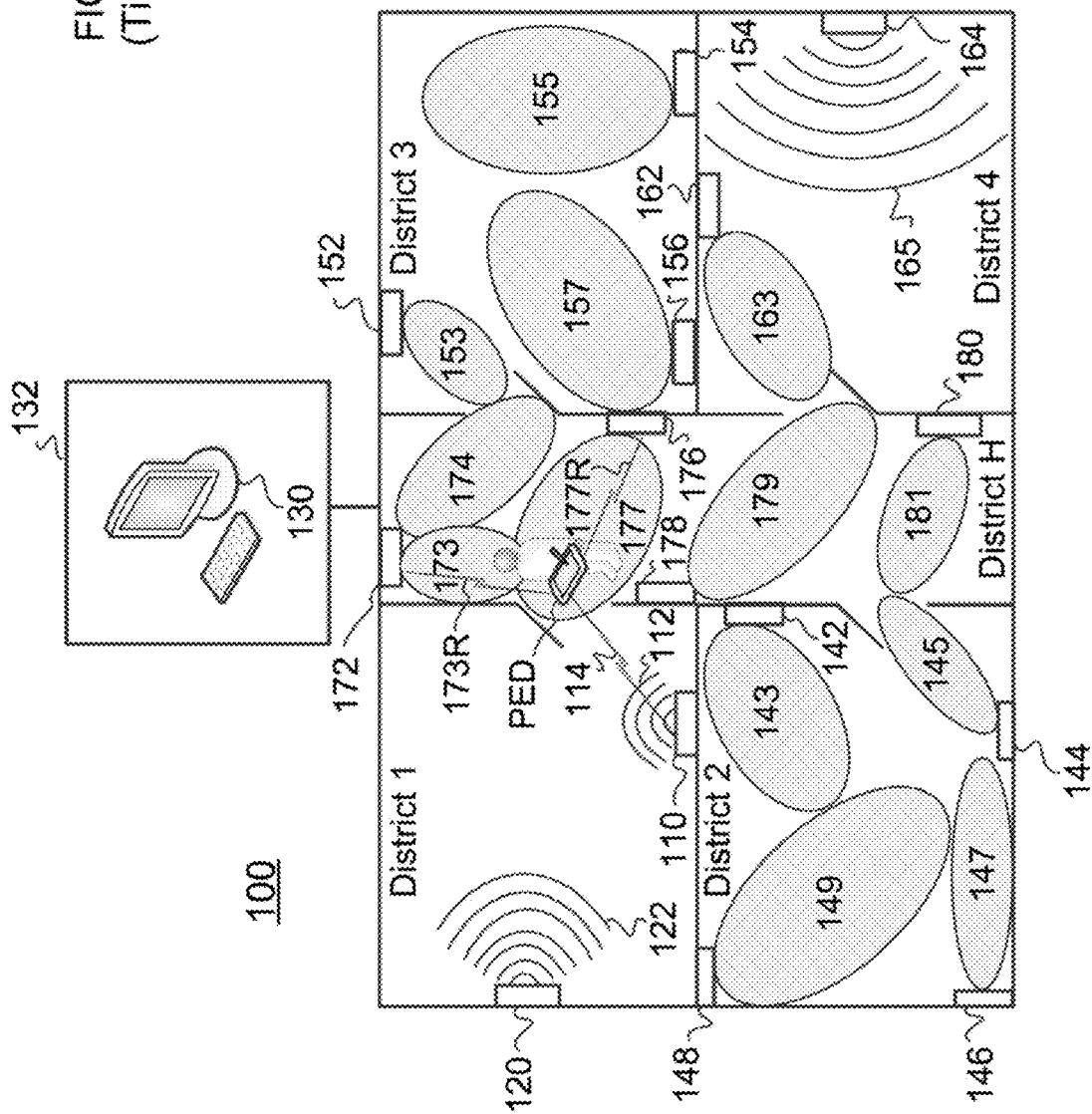

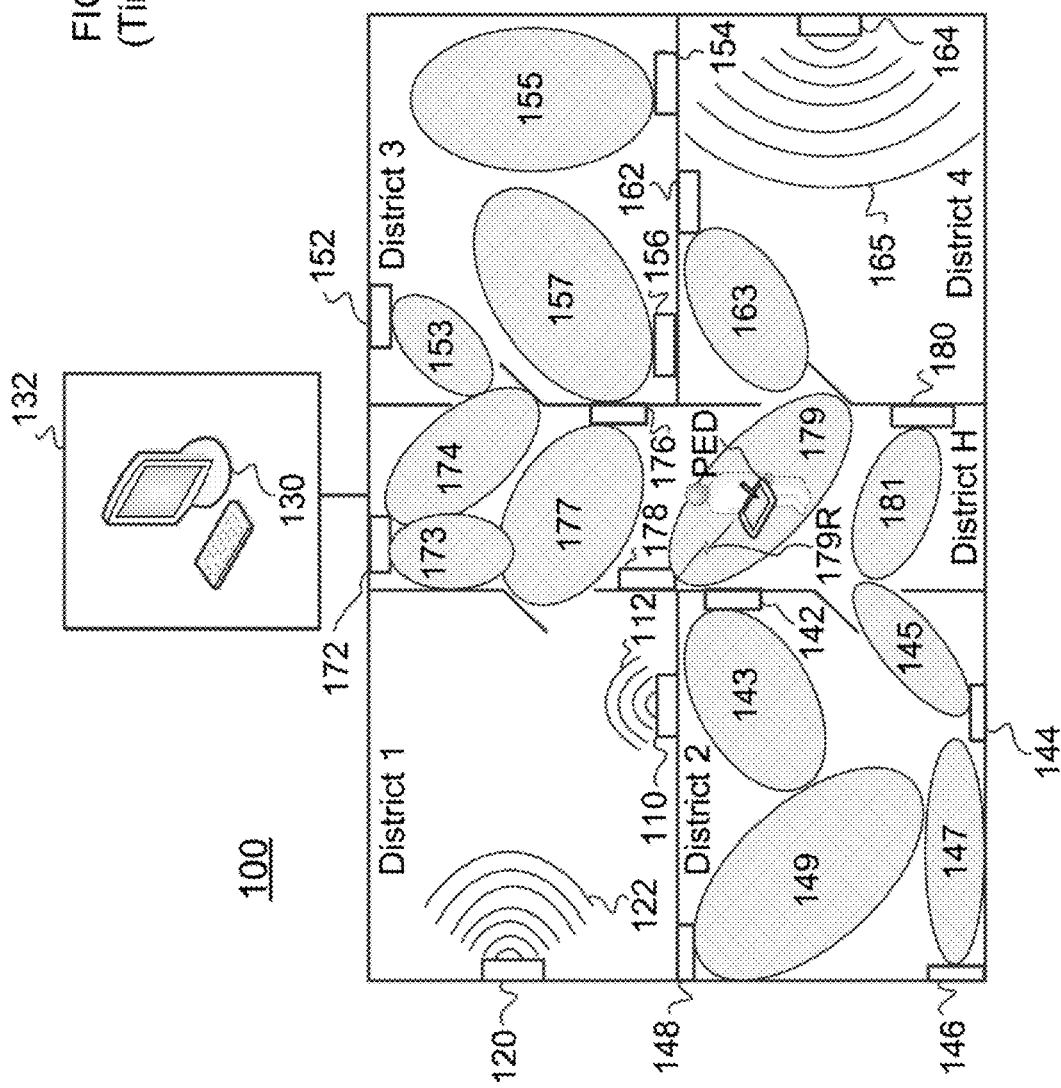

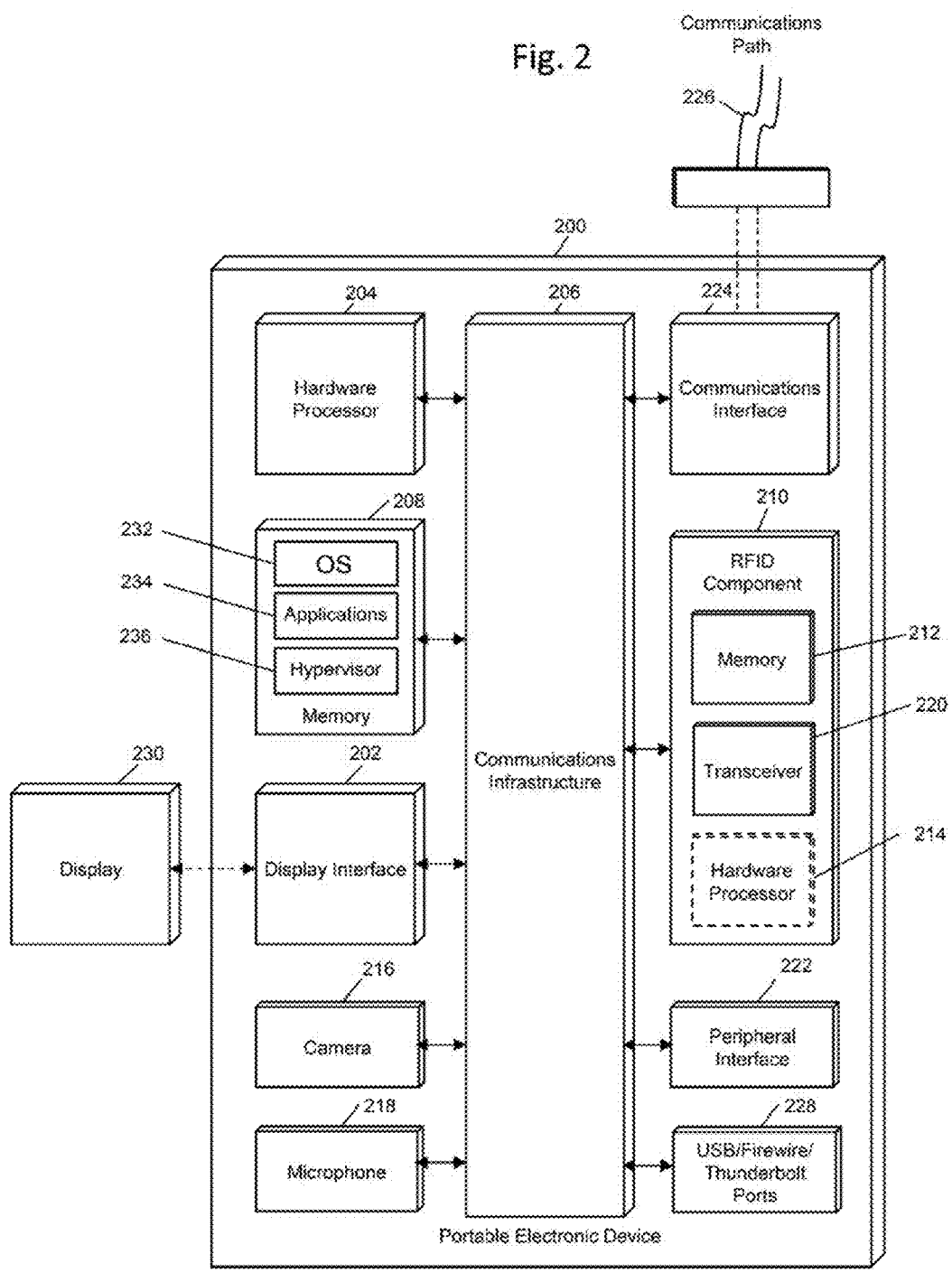

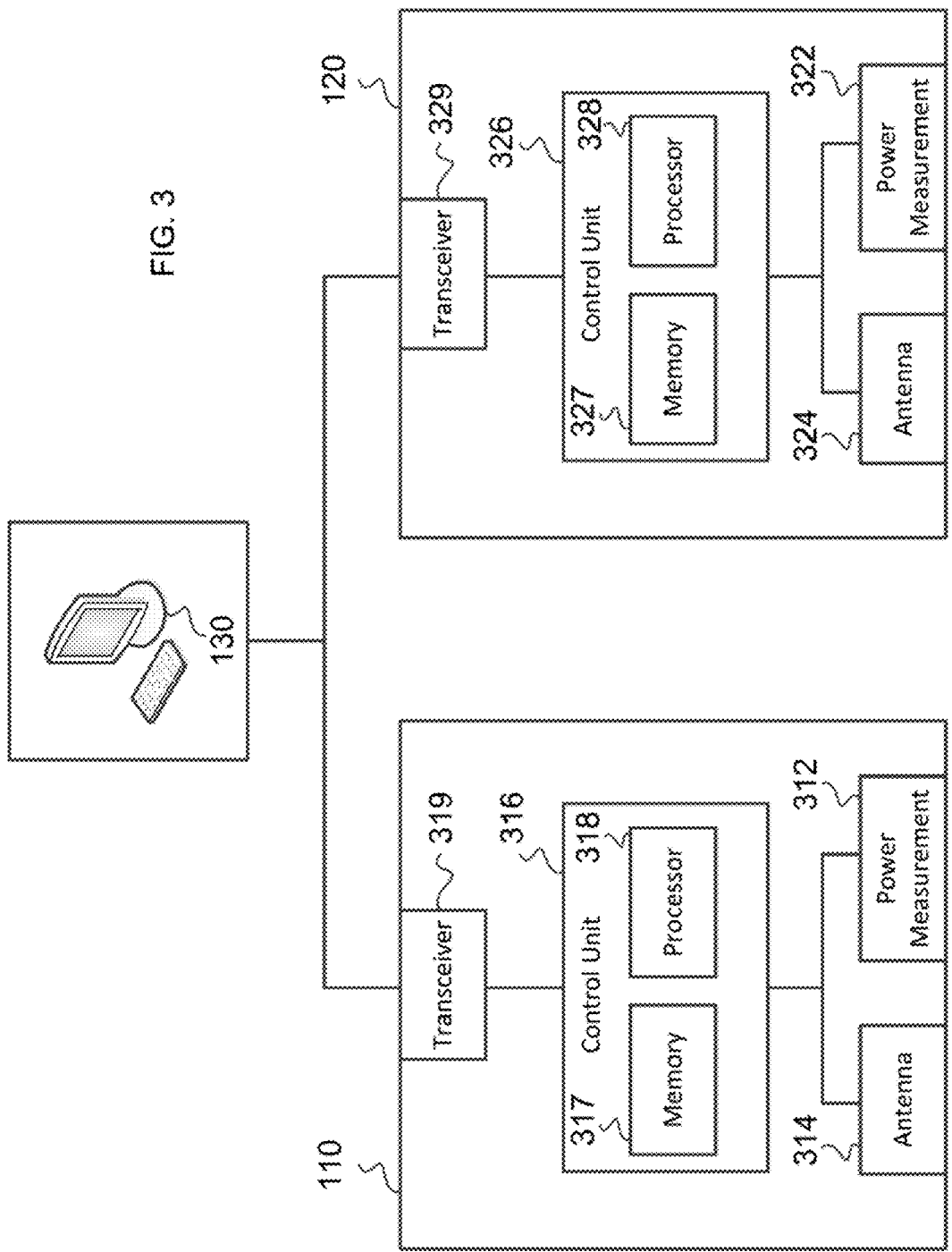

FIG. 5

| RFID Reader | Time 1 (Fig. 1A) | Time 2 (Fig. 1B) | Time 3 (Fig. 1C) | Time 4 (Fig. 1D) | Time 5 (Fig. 1E) |
|---|---|---|---|---|---|
| 110 | 75 | 35 | 70 | 30 | x |
| 120 | 45 | 60 | 35 | x | x |
| 142 | x | x | x | x | x |
| 144 | x | x | x | x | x |
| 146 | x | x | x | x | x |
| 148 | x | x | x | x | x |
| 152 | x | x | x | x | x |
| 154 | x | x | x | x | x |
| 156 | x | x | x | x | x |
| 162 | x | x | x | x | x |
| 164 | x | x | x | 50 | x |
| 172 | x | x | x | 60 | x |
| 176 | x | x | x | x | x |
| 178 | x | x | x | x | 65 |
| 180 | x | x | x | x | x |

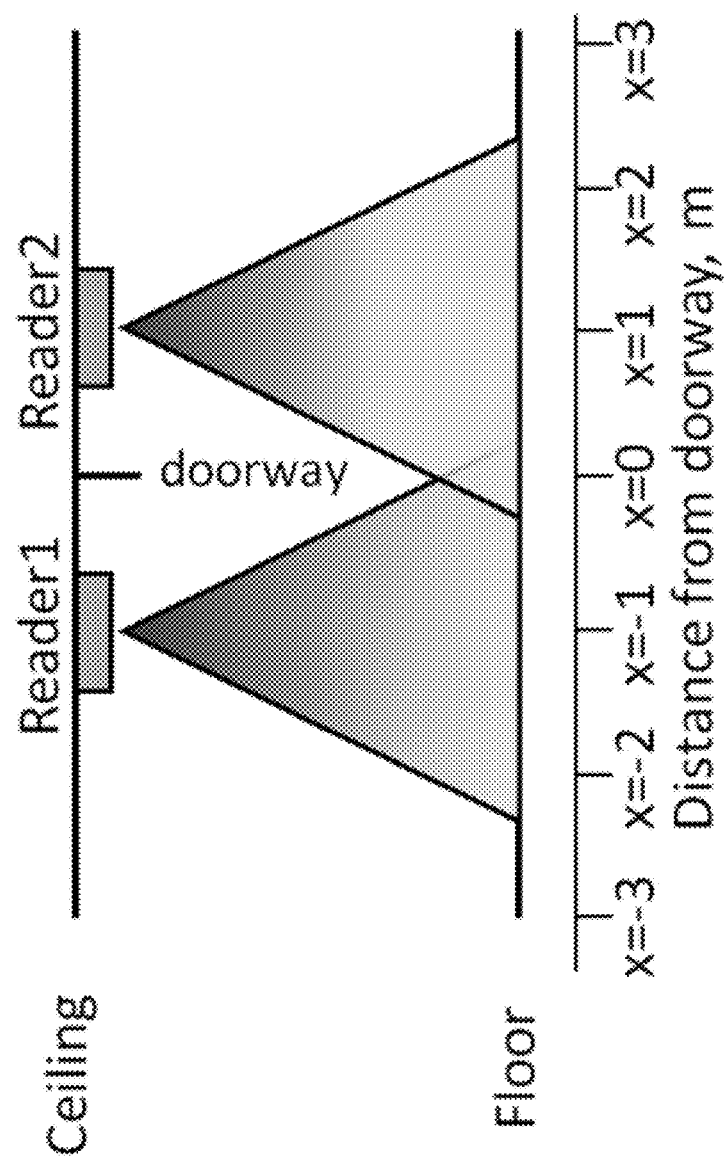

SYSTEM AND METHOD FOR DETECTING MOVEMENT OF A MOBILE ASSET AND CONTROLLING OPERATIONS OF THE ASSET BASED ON ITS MOVEMENT

FIELD

The present disclosure relates to a system and method for detecting the movement of a mobile asset based on the use of radio frequency identification (RFID). For example, the system and method can be employed in a building in which various security protocols are implemented in different areas of the building. The mobile asset may be, for example, a portable electronic device such as a laptop computer, a tablet computer, or a smartphone. The system and method of the present disclosure also continuously validate whether the mobile asset enters, leaves or remains in a particular area over a period of time, and authorize the mobile asset to perform certain operations based on the travel or current location of the asset. For example, the system and method can enable and control the operation and/or execution of certain hardware and software components of the mobile asset based on the detected movement and location of the mobile asset.

BACKGROUND INFORMATION

Known RFID implementations are built around the concept of tracking the physical location of an asset (e.g., a product such as a mobile computing device) having an RFID tag affixed thereto. The RFID tag is read by a radio frequency (RF) reader. In this scenario, the asset is not self-aware of its RFID-based location as all location information is exchanged between the RFID tag and the RFID reader(s).

US 2016/0088432 discloses a system and method for location-based security, in which a portable electronic device (e.g., a laptop, tablet computer, smartphone, etc.) having an RFID tag receives a proximity signal from an RFID reader when the portable electronic device is within a predetermined range of the RFID reader. The processor of the portable electronic device is then configured to control at least one operation of the portable electronic device in accordance with the proximity signal. For example, the processor of the portable electronic device is configured to enable or disable access to executable applications or files stored in the portable electronic device, enable or disable access to at least one operating system of the portable electronic device, and/or enable or disable access to at least one hardware component (e.g., a camera) of the portable electronic device.

SUMMARY

An exemplary embodiment of the present disclosure provides a system for detecting direction of movement. The exemplary system includes a first radio frequency identification (RFID) reader arranged in a first location. The first RFID reader is configured to transmit a first location signal from the first location, and to receive a first response signal from a portable electronic device when the portable electronic device is within range of the first location to receive the first location signal. The exemplary system also includes a second RFID reader arranged in a second location distinct from the first location. The second RFID reader is configured to transmit a second location signal from the second location, and to receive a second response signal from the portable electronic device when the portable electronic device is within range of the second location to receive the second location signal. In addition, the exemplary system includes a controller configured to determine whether the first and second response signals received by the first and second RFID readers respectively satisfy a predetermined condition at a first time and a second time subsequent to the first time. The controller is also configured to determine a direction of movement of the portable electronic device relative to the first and second locations during the first and second times based on whether the first and second response signals respectively satisfy the predetermined condition at the first and second times.

An exemplary embodiment of the present disclosure provides a method of detecting direction of movement. The exemplary method includes transmitting, from a first radio frequency identification (RFID) reader arranged in a first location, a first location signal from the first location, and transmitting, from a second RFID reader arranged in a second location distinct from the first location, a second location signal from the second location. The exemplary method also includes receiving, at the first RFID reader, a first response signal from a portable electronic device (PED) when the portable electronic device is within range of the first location to receive the first location signal transmitted by the first RFID reader. In addition, the exemplary method includes receiving, at the second RFID reader, a second response signal from the portable electronic device when the portable electronic device is within range of the second location to receive the second location signal transmitted by the second RFID reader. The exemplary method also includes determining, by a hardware processor of a controller, whether the first and second response signals received by the first and second RFID readers respectively satisfy a predetermined condition at a first time and a second time subsequent to the first time. In addition, the exemplary method includes determining, by the processor of the controller, a direction of movement of the portable electronic device relative to the first and second locations during the first and second times based on the determination of whether the first and second response signals respectively satisfy the predetermined condition at the first and second times.

BRIEF DESCRIPTION OF THE DRAWINGS

Additional refinements, advantages and features of the present disclosure are described in more detail below with reference to exemplary embodiments illustrated in the drawings.

FIGS. 1A-1E are diagrams of an exemplary system of the present disclosure at different times to illustrate the detection of motion of a portable electronic device (PED) at the different times.

FIG. 2 is a block diagram illustrating the hardware architecture of portable electronic device in accordance with an exemplary embodiment.

FIG. 3 is a block diagram illustrating the hardware architectures of RFID readers in a district of the system of FIGS. 1A-1E, in accordance with an exemplary embodiment.

FIG. 5 is a chart showing the respective powers of response signals transmitted by the portable electronic device to RFID readers in the exemplary system during times 1-5 illustrated in FIGS. 1A-1E, respectively.

FIG. 6 is a diagram of an exemplary system for illustrating the detection of movement of a portable electronic device between two RFID readers in different coverage areas.

Figure 4:
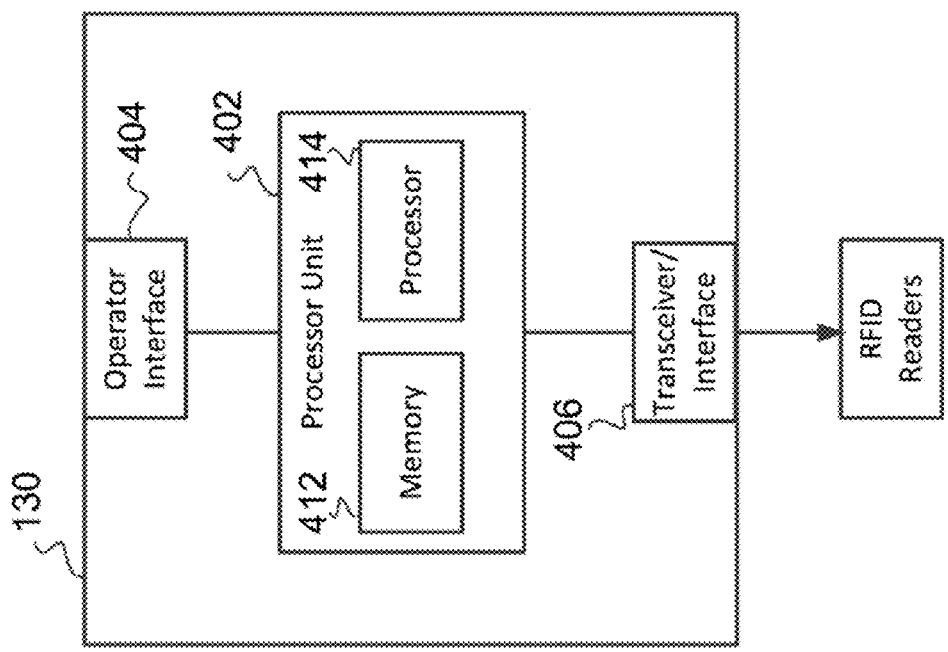
FIG. 4 is a block diagram illustrating the hardware architecture of the controller of the system of FIGS. 1A-1E, in accordance with an exemplary embodiment.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

This description provides exemplary embodiments only, and is not intended to limit the scope, applicability or configuration of the system and method of the present disclosure, or the constituent components of the system of the present disclosure, such as the RFID readers, the controller(s) and the portable electronic devices described herein. Rather, the ensuing description of exemplary embodiments will provide those skilled in the art with an enabling description for implementing embodiments the system and method of the present disclosure. Various changes may be made in the function and arrangement of the constituent components of the system and method without departing from the spirit and scope of the disclosure as set forth in the appended claims. Thus, various embodiments may omit, substitute, or add various features, procedures or components as appropriate. For instance, it should be appreciated that in alternative embodiments, the methods may be performed in an order different than that described, and that various steps may be added, omitted or combined. Different aspects and elements of the embodiments may be combined in a similar manner.

FIGS. 1A-1E illustrate an exemplary system 100 in which the embodiments of the present disclosure can be implemented. FIGS. 1A-1E illustrate the exemplary system 100 at different times to illustrate the detection of motion of a portable electronic device (PED) at the different times. FIGS. 1A-1E illustrate the exemplary system 100 at times 1-5, respectively.

The exemplary system 100 is illustrated in FIGS. 1A-1E as being implemented in a building having a plurality of distinct districts and a controller 130 for those districts. The system of the present disclosure includes a plurality of RFID readers and the controller 130. In the example of FIGS. 1A-1E, there are four districts 1-4 illustrated as rooms of the building, and another district H which is a hallway between the rooms. In the illustrated example, there is at least one RFID reader in each district, and each RFID is arranged in a different location relative to the other RFID readers in the exemplary system 100. For instance, RFID readers 110 and 120 are located in District 1, RFID readers 142, 144, 146 and 148 are located in District 2, RFID readers 152, 154 and 156 are located in District 3, RFID readers 162 and 164 are located in District 4, and RFID readers 172, 172, 176, 178 and 180 are located in District H. The RFID readers may be arranged at any location in the various districts. For example, the RFID readers may be individually arranged on a wall or ceiling of a district, or near the doorway of a district, such as above the doorframe or on the front or back of a door. The RFID readers can be arranged in different locations in a particular district, and the placement and directionality of an RFID reader may depend on the desired area of coverage for a particular RFID reader.

In the example of FIGS. 1A-1E, a single controller 130 is provided for districts 1-4 and H, which are located on a floor of a building, as described above. The present disclosure is not limited to this example. One or more districts can be located on one floor of a budding, while other districts can be located on different floors of the budding. A single controller 130 can be provided for all the districts on multiple floors of a building. Alternatively, multiple controllers 130 can be provided for individual groups or subsets of districts, such as an individual controller 130 for each individual floor of a budding, and/or an individual controller 130 for a selected number of districts (e.g., one controller 130 for ten districts). The number of districts and controller(s) is customizable based on the building or area to be monitored. In the case of multiple controllers, one of the controllers can be designated as the supervisory controller while the other controllers are subordinate controllers that provide information on the readings of the RFID readers to the supervisory controller, which in turn carries out the operative functions of determining a direction of movement of a portable electronic device, as described herein. Exemplary embodiments of the present disclosure are described below using the example of FIGS. 1A-1E in which there is a single controller 130 for controlling the multiple districts 1-4 and H. The controller(s) 130 of the system can be communicatively connected to the RFID readers through wired mediums such as Ethernet wiring and/or through wireless mediums such as Wi-Fi, for example.

In the exemplary system 100 illustrated in FIGS. 1A-1E, each of the RFID readers respectively has a coverage area dependent on the individual reader's antenna design. As used herein, the term "coverage area" means an area that an RFID reader illuminates with RF radiation sufficient to facilitate RFID operation and communications in that area. In RF engineering, the "coverage area" or "coverage pattern" may be described by parameters for any one or more of (i) the propagation direction, (ii) illumination beam width, (iii) beam range, and (iv) frequency of transmission (i.e., the frequency at which the RFID transmits RFID signals). The coverage area of each RFID reader can be individually configured. For instance, in the exemplary system 100 illustrated in FIGS. 1A-1E, the various RFID readers can be configured to have different types of coverage areas with respect to the directionality, propagation direction, beam width and/or orientation (i.e., polarization) of their respective coverage areas. For example, RFID readers 110 and 120 in District 1, and RFID reader 164 in District 4 each produce coverage beams with propagation directions that are 90° from one another. As used herein, the term "propagation direction" means the angle of illumination of the antenna (e.g., transceivers 319, 329 in FIG. 3) of an RFID reader. In the exemplary, system 100 of FIGS. 1A-1E, RFID readers 142, 144, 146 and 148 in District 2, RFID readers 152, 154 and 156 in District 3, RFID reader 162 in District 3, and RFID readers 172, 172, 176, 178 and 180 in District H each have a beam width that is less than 180°. For example, RFID reader 146 in District 2 has a beam width of approximately 25°, whereas RFID reader 148 in District 2 has a beam width of approximately 60°. The coverage areas illustrated in the exemplary system 100 of FIGS. 1A-1E are intended to be illustrative examples, and the present disclosure is not limited thereto. According to an exemplary embodiment, the coverage area beam width of each RFID reader can be individually configured from approximately 10°-360° depending on the desired coverage area for a particular location. One skilled in the art of antenna design will appreciate how the coverage pattern propagation direction, propagation range, polarization, and beam width can be configured in either the elevation or azimuthal directions. While it is possible to configure an RFID reader to have a coverage area beam width less than 10°, such a narrow coverage area beam width may result in a coverage area that may be too narrow to be useful in detecting the movement of a portable electronic device into that coverage area. Nevertheless, it should be understood that an RFID reader can be configured to have a narrow coverage pattern, for example, less than 10°.

As is known in the art, RFID readers regularly transmit interrogation signals in their respective coverage areas. The interrogation signals are radio signals and may be encoded. The frequency of transmission of the interrogation signals can be set as desired. In the exemplary embodiments described below, the interrogation signals are described as "location signals" since the respective interrogation signals transmitted by each RFID reader are associated with the location of the corresponding RFID readers. For clarity of illustration, the location signals (i.e., interrogation signals) are illustrated for RFID readers 142, 144, 146, 152, 154, 156, 162, 172, 176, 178 and 180 as the corresponding coverage areas of these RFID readers in FIGS. 1A-1E, respectively. In the exemplary system 100 of FIGS. 1A-1E, RFID reader 110 transmits location signal 112, RFID reader 120 transmits location signal 122, and RFID reader 164 transmits location signal 165. As used herein, the power of a signal is related to the amplitude of the signal, i.e. the amplitude of the electromagnetic wave. According to an exemplary embodiment, the respective power and frequency of the location signals transmitted by each RFID reader can be individually customized to service a particular coverage area. For example, as illustrated in the exemplary system 100 of FIGS. 1A-1E, the power of the interrogation signal of RFID reader 152 in District 3 is less than the respective powers of the interrogation signals of the RFID readers 154 and 156 in District 3. As such, in the exemplary system 100 of FIGS. 1A-1E, the coverage area 153 of RFID reader 152 does not extend as far in the direction of the apex of the coverage area 153 as the corresponding coverage areas 155 and 157 of RFID readers 154 and 156, respectively. In addition, the coverage pattern of RFID reader 152 is smaller than the respective coverage patterns of RFID readers 154 and 156. In the exemplary system 100 of FIGS. 1A-1E, the power of the interrogation signal transmitted by RFID reader 152 and the propagation pattern of RFID reader 152 were selected to cover a smaller coverage area 153 than the respective coverage areas 155 and 157 of RFID readers 154 and 156, i.e., near the doorway of District 3.

In the exemplary system 100 of FIGS. 1A-E, RFID reader 172 is illustrated as having two different coverage areas with different propagation patterns. An RFID reader according to the present disclosure can have different coverage areas with different propagation directions by having multiple antennae each being configured to service a particular coverage area with a particular propagation direction. In the exemplary system 100 of FIGS. 1A-1E, the coverage areas, propagation directions, frequency of transmission of the location signals, and power at which the location signals are transmitted are respectively configured for each RFID reader to illuminate particular areas of interest to assist in the detection of movement of a portable electronic device into, out of, and through those areas of interest.

An overview of the features of the exemplary system for detecting direction of movement of a portable electronic device will now be provided. The examples of FIGS. 1A-1E illustrate movement of the portable electronic device between time 1 (represented in FIG. 1A), time 2 (represented in FIG. 1B), time 3 (represented in FIG. 1C), time 4 (represented in FIG. 1D), and time 5 (represented in FIG. 1E). As shown in FIG. 1A, the portable electronic device is closer to RFID reader 110 than RFID reader 120 in District 1 at time 1. As shown in FIG. 1B, the portable electronic device has moved away from RFID reader 110 closer to RFID reader 120 at time 2. Reader 110 is closer to the doorway of district 1, while reader 120 is on the far wall of district 1. Reader 110 is arranged in a first location in district 1 (i.e., at the lower wall of district 1 near the doorway to district 1), while reader 120 is arranged in a second location in district 1 (i.e., on the far wall of district 1). As illustrated in FIGS. 1A-1E, RFID readers 110 and 120 are arranged at different locations in district 1, RFID readers 142, 144, 146 and 148 are arranged at different locations in District 2, RFID readers 152, 154 and 156 are arranged at different locations in District 3, RFID readers 162 and 164 are arranged at different locations in District 4, and RFID readers 172, 172, 176, 178 and 180 are arranged at different locations in District H.

As shown in FIG. 1C, the portable electronic device has moved away from RFID reader 120 back toward RFID reader 110, closer to the doorway of District 1 than in FIG. 1A. As shown in FIG. 1D, the portable electronic device has moved out of District 1 into District H, in close proximity to RFID readers 172, 176 and 178. As shown in FIG. 1E, the portable electronic device has moved farther down the hallway toward Districts 2 and 4.

The controller 130 of the exemplary system is configured to determine the direction of movement of the portable electronic device when the portable electronic device moves between two or more districts. For instance, in the following example, the controller is described as determine the direction of movement of the portable electronic device between time 1 (FIG. 1A) and time 2 (FIG. 1B).

In the example of FIGS. 1A and 1B, RFID reader 110 can be considered a first RFID reader, and RFID reader 120 can be considered a second RFID reader. In the illustrated example, the first RFID reader 110, which is arranged in a first location (i.e., the lower wall of district 1 in FIG. 1), is configured to transmit a first location signal 112 from the first location, and to receive a first response signal 114 from the portable electronic device when the portable electronic device is within range of the first location to receive the first location signal 112. The second RFID reader 120, which is arranged in a second location distinct from the first location (i.e., the far wall of District 1), is configured to transmit a second location signal 122 from the second location, and to receive a second response signal 124 from the portable electronic device when the portable electronic device is within range of the second location to receive the second location signal 122. According to an exemplary embodiment, the portable electronic device is configured to transmit different response signals 114, 124 to the different RFID readers 110, 120 because the response signals 114, 124 are individually responsive to the different location signals 112, 122, respectively. Similarly, as shown in FIG. 1D, for example, the portable electronic device transmits response signal 173R to RFID reader 172 when the portable electronic device is within range of the location of the RFID reader 172 (i.e., within the coverage area 173 of the RFID reader 172). In FIG. 1D, the portable electronic device transmits response signal 177R to RFID reader 176 upon receiving the location signal from RFID reader 176. In the example of FIG. 1D, the portable electronic device is also illustrated as transmitting response signal 114 to RFID reader 110, because the portable electronic device still receives the location signal 112 from RFID reader 110. In FIG. 1E, the portable electronic device transmits response signal 179R to RFID reader 178 upon receiving the location signal from RFID reader 178 (i.e., when the portable electronic device is within the coverage area 179 of RFID reader 178).

Returning to the example of movement of the portable electronic device between FIG. 1A (time 1) and FIG. 1B (time 2), the controller 130 is configured to determine whether the first and second response signals 114, 124 received by the first and second RFID readers 110, 120 respectively satisfy a predetermined condition (e.g., threshold of power respectively present in the first and second response signals, Received Signal Strength indication (RSSI) in the first and second response signals, etc.) at the first time (FIG. 1A) and the second time (FIG. 1B) subsequent to the first time. Examples of the above-described predetermined condition will be described below. In addition, the controller 130 is configured to determine a direction of movement of the portable electronic device relative to the first and second locations (i.e., the location of the RFID readers 110, 120 in the above example) during the first and second times based on whether the first and second response signals 114, 124 respectively satisfy the predetermined condition at the first and second times. As will be described in more detail below with reference to FIG. 4, the controller 130 includes a hardware processor 414 that, by executing a computer program and/or computer-readable instructions tangibly recorded on the memory 412, which is anon-transitory computer-readable recording medium (e.g., a ROM, hard-disk drive, solid-state drive, flash memory, optical memory, etc.), carries out the operative functions of the controller 130 as described herein.

In accordance with an exemplary embodiment, the above-described predetermined condition can be a threshold of power present in the first and second response signals 114, 124 respectively received by the first and second RFID readers 110, 120. As noted above, the power of a signal is the amplitude of the signal, i.e. the amplitude of the electromagnetic wave. In this example, the controller 130 is configured to determine whether the portable electronic device is present in the first location at the first and second times based on the power present in the first response signal 114 received by the first RFID reader 110 at the first and second times, respectively. In addition, the controller 130 is configured to determine whether the portable electronic device is present in the second location at the first and second times based on the power present in the second response signal 124 received by the second RFID reader 120 at the first and second times, respectively.

According to an exemplary embodiment, the controller 130 is configured to determine the direction of movement of the portable electronic device PED relative to the first and second locations by (a) comparing the respective powers present in the first and second response signals 114, 124 at the first time relative to the respective powers present in the first and second response signals 114, 124 at the second time, and (b) determining the direction of movement of the portable electronic device (PED) relative to the first and second locations based on the comparison of the respective powers present in the first and second response signals 114, 124 at the first and second times.

The above-described features will be explained with reference to the examples of FIGS. 1A-1E. FIG. 5 is a chart showing the respective powers of response signals transmitted by the portable electronic device to RFID readers in the exemplary system during times 1-5 illustrated in FIGS. 1A-1E, respectively. For clarity of illustration, the respective powers of the response signals are described in FIG. 5 as numerical RSSI values. As shown in FIG. 3, which will be described in more detail below, RFID readers 110 and 120 each respectively include a power measurement unit 312, 322, and a control unit 316, 326, which includes a memory 317, 327 and a hardware processor 318, 328. The other RFID readers in the exemplary system 100 of FIGS. 1A-1E have corresponding constituent elements. The power measurement units 312, 322 measure the power (i.e., amplitude) present in a received response signal, and the processors 318, 328 convert the measured power into a numerical RSSI value that ranges, for example, from 0 to 100, where 0 means no power, and 100 is the highest possible level of power that is expected to be received. FIG. 5 illustrates the RSSI power values of the response signals received in the examples of FIGS. 1A-1E.

As shown in FIG. 5, at time 1, the power of the response signal received by RFID reader 110 exceeds the power of the response signal received by RFID reader 120 at time 1. However, at time 2, the power of the response signal received by RFID reader 110 is less than the power of the response signal received by RFID reader. Based on these comparative values, the controller 130 determines that, between time 1 and time 2, the portable electronic device has moved away from RFID reader 110 toward RFID reader 120, since the power of the response signals received by RFID reader 110 decreased between time 1 and time 2, and the power of the response signals received by RFID 120 increased between time 1 and 2. Conversely, between time 2 and time 3, the controller 130 determines, based on the power levels at times 1-3, that the portable electronic device has moved away from RFID reader 120 back toward RFID reader 120, since the power of the response signals received by RFID reader 110 increased between time 2 and time 3, and the power of the response signals received by RFID reader 120 decreased between time 2 and time 3. The controller 130 similarly analyzes the level of power present in the response signals for times 4 and 5.

Accordingly, with reference to the examples of FIGS. 1A and 1B, the controller 130 is configured to determine whether the portable electronic device is closer to the first location (i.e., the location of RFID reader 110) or the second location (i.e., the location of RFID reader 120) at the first time (time 1) by (a) comparing the power present in the first response signal 114 to the power present in the second response signal 124 at the first time, (b) determining that the portable electronic device is closer to the first location at the first time when the power present in the first response signal 114 is greater than the power present in the second response signal 124 at the first time, and (c) determining that the portable electronic device PFD is closer to the second location at the first time when the power present in the second response signal 124 is greater than the power present in the first response signal 114 at the first time. Further, with continued reference to the examples of FIGS. 1A and 1B, the controller 130 is configured to determine whether the portable electronic device is closer to the first location or the second location at the second time (time 2) by (d) comparing the power present in the first response signal 114 to the power present in the second response signal 124 at the second time, (e) determining that the portable electronic device is closer to the first location at the second time when the power present in the first response signal 114 is greater than the power present in the second response signal 124 at the second time, and (f) determining that the portable electronic device is closer to the second location at the second time when the power present in the second response signal 124 is greater than the power present in the first response signal 114 at the second time.

In accordance with the above-described examples of FIGS. 1A and 1B, the controller 130 is configured to determine the direction of movement of the portable electronic device by (a) determining whether the portable electronic device is closer to the first location (i.e., the location of RFID reader 110) or the second location (i.e., the location of RFID reader 120) at the first time, (b) determining whether the portable electronic device is closer to the first location or the second location and the second time, and (c) deriving the direction of movement of the portable electronic device based on the determinations of whether the portable electronic device is closer to the first location or the location at the first and second times, respectively.

FIG. 3 is a block diagram illustrating the hardware architectures of RFID readers in a district of the system of FIGS. 1A-1E, in accordance with an exemplary embodiment. The hardware architectures of RFID readers 110 and 120 are provided as examples. The other RFID readers 110 and 120 can have similar constituent components. As illustrated in FIG. 3, the RFID readers 110 and 120 respectively include a power measurement unit 312, 322, an antenna 314, 324, a control unit 316, 326 having a non-transitory computer-readable recording memory 317, 318, and a hardware processor 318, 328, and a transceiver 319, 329, respectively. The antenna 314, 324 of the RFID readers transmit the above-described location signals to the respective coverage area of the RFID reader and receive a corresponding location signal when the portable electronic device is within range of the RFID reader to receive the location signal for a particular coverage area (e.g., when the portable electronic device is within the coverage area of RFID reader 110 to receive location signal 112 to transmit the response signal 114 to RFID reader 110). The respective power measurement units 312, 322 are configured to measure the amount of power present in the response signal received by the corresponding RFID reader. For example, with reference to FIG. 1A, power measurement unit 312 of RFID reader 110 is configured to measure the amount of power present in the response signal 114 received from the portable electronic device when the portable electronic device is within range of the location of RFID reader 110 to receive the location signal 112. Similarly, power measurement unit 322 of RFID reader 120 is configured to measure the amount of power present in the response signal 124 received from the portable electronic device when the portable electronic device is within range of the location of the RFID reader 120 to receive the location signal 122.

The control units 316, 326 of the RFID readers 110, 120 each include a non-transitory computer readable recording medium as tangible memories 317, 327, and hardware processors 318, 328 for carrying out the operative functions of the RFID readers. As discussed above, a hardware processor device as discussed herein may be a single hardware processor, a plurality of hardware processors, or combinations thereof. Hardware processor devices may have one or more processor "cores." The hardware processors 318, 328 execute an operating system and computer programs tangibly recorded on the memories 317, 327. The memories 317, 327 may also store a control policy to control operations of the portable electronic device based on the detected location and movement of the portable electronic device. For example, the control policy may authorize or prevent the portable electronic device from accessing certain hardware resources such as the camera 216, microphone 218 or interlaces 222 or 228 when the portable electronic device is detected to be in a particular District (e.g., District 1), when the portable electronic device is detected to move in a particular pattern (e.g., leave District 1 but return to District 1 within a predetermined time), and/or when the portable electronic device has been in a particular district for a predetermined period of time.

According to the above-described exemplary embodiment, the first RFID reader 110 includes a first power measurement unit 310 configured to measure power present in the first response signal 114 received by the first RFID reader 110, a first control unit 316 configured to generate a first RSSI signal indicating the measured power in the first response signal 114, and a first transceiver 319 configured to transmit the first RSSI signal to the controller 130 when the first RFID reader 110 receives the first response signal 114. The second RFID reader 120 includes a second power measurement unit configured to measure power in the second response signal 124 received by the second RFID reader 120, a second control unit 326 configured to generate a second RSSI signal indicating the measured power in the second response signal 124, and a second transceiver 329 configured to transmit the second RSSI signal to the controller 130 when the second RFID reader 120 receives the second response signal 124. According to the above-described exemplary embodiments illustrated in FIGS. 1A-1E and 3-5, the controller 130 is configured to determine an amount of power present in the first response signal 114 based on the first RSSI signal received from the first RFID reader 110, and to determine an amount of power present in the second response signal 124 based on the second RSSI signal received from the second RFID reader 120.

According to the exemplary embodiments of FIGS. 1A-1E and 3-5, the above-described predetermined condition can be a threshold value of the amount of power present in the first and second response signals 114, 124 respectively received by the first and second RFID readers 110, 120. The controller 130 is configured to determine whether the portable electronic device is present in the first location at the first and second times based on the power present in the first response signal 114 received by the first RFID reader 110 at the first and second times, respectively. Further, the controller 130 is configured to determine whether the portable electronic device is present in the second location at the first and second times based on the power present in the second response signal 124 received by the second RFID reader 120 at the first and second times, respectively. For example, the controller 130 is configured to determine the direction of movement of the portable electronic device relative to the first and second locations by comparing the respective powers present in the first and second response signals 114, 124 at the first time relative to the respective powers present in the first and second response signals 114, 124 at the second time, and determining the direction of movement of the portable electronic device relative to the first and second locations based on the comparison of the respective powers present in the first and second response signals 114, 124 at the first and second times.

According to the exemplary embodiments of FIGS. 1A-1E and 3-5, the controller 130 is configured to determine whether the portable electronic device is closer to the first location or the second location at the first time by (a) comparing the power present in the first response signal to the power present in the second response signal at the first time (see FIG. 5), (b) determining that the portable electronic device is closer to the first location at the first time when the power present in the first response signal 114 is greater than the power present in the second response signal 124 at the first time, and determining that the portable electronic device is closer to the second location at the first time when the power present in the second response signal 124 is greater than the power present in the first response signal 114 at the first time. In addition, the controller 130 is configured to determine whether the portable electronic device PED is closer to the first location or the second location at the second time by (d) comparing the power present in the first response signal 114 to the power present in the second response signal 124 at the second time, (e) determining that the portable electronic device is closer to the first location at the second time when the power present in the first response signal 114 is greater than the power present in the second response signal 124 at the second time, and (f) determining that the portable electronic device is closer to the second location at the second time when the power present in the second response signal 124 is greater than the power present in the first response signal 114 at the second time.

In accordance with the above-described embodiments, the controller 130 is configured to determine the direction of movement of the portable electronic device by (a) determining whether the portable electronic device is closer to the first location or the second location at the first time, (b) determining whether the portable electronic device is closer to the first location or the second location and the second time, and (c) deriving the direction of movement of the portable electronic device based on the determinations of whether the portable electronic device is closer to the first location or the location at the first and second times, respectively.

FIGS. 6-9 provide another illustrative example of the functionality of the RFID readers and the controller in the exemplary system of the present disclosure. FIG. 6 is a diagram of an exemplary system for illustrating the detection of movement of a portable electronic device between two RFID readers in different coverage areas. In FIG. 6, two readers (Reader 1 and Reader 2) are arranged on opposite sides of a boundary (e.g., doorway) between two districts. In this example, the readers have coverage areas as shown in FIG. 6, where the vertical plane of the door defines the location x=0 as an RFID component (e.g., RFID tag) of a portable electronic device moves from district 1 to district. In this example, Reader 1 is arranged in the ceiling at x=−1, and Reader 2 is arranged in the ceiling at x=1.

Figures 7A, 7B:
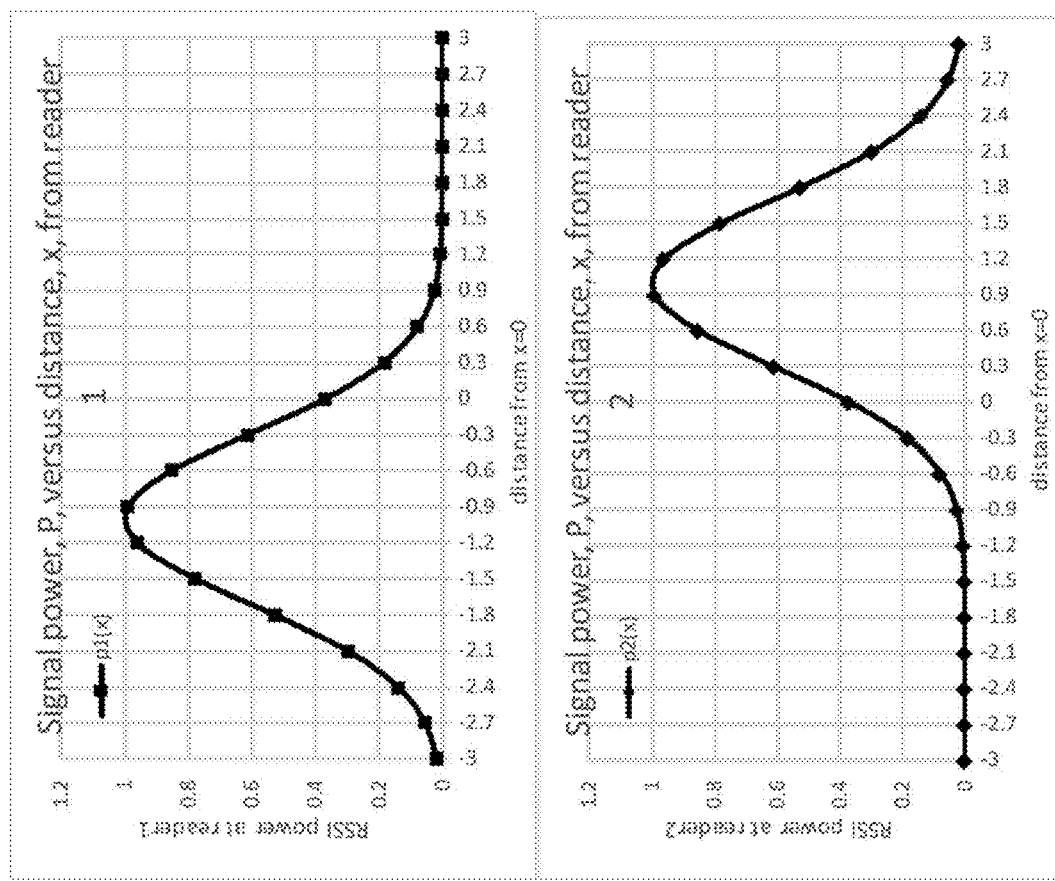
FIG. 7A is a graph illustrating the measured power of a response signal received by RFID reader 1 in FIG. 6 as a portable electronic device moves relative to the location of RFID reader 1 in FIG. 6.
FIG. 7B is a graph illustrating the measured power of a response signal received by RFID reader 2 in FIG. 7 as the portable electronic device moves relative to the location of RFID reader 2 in FIG. 7.

As the RFID tag in the portable electronic device is moved from the district of Reader 1, for example from x=−3, through the doorway, to x=+3, the power of the response signal from the tag measured at Reader 1 will vary as shown in FIG. 7A. Likewise, as the RFID tag in the portable electronic device is moved from the district of Reader 2, for example from x=−3, through the doorway to x=+3, the power of the response signal from the tag measured at Reader 2 will vary as shown in FIG. 7B.

Figures 8A, 8B:
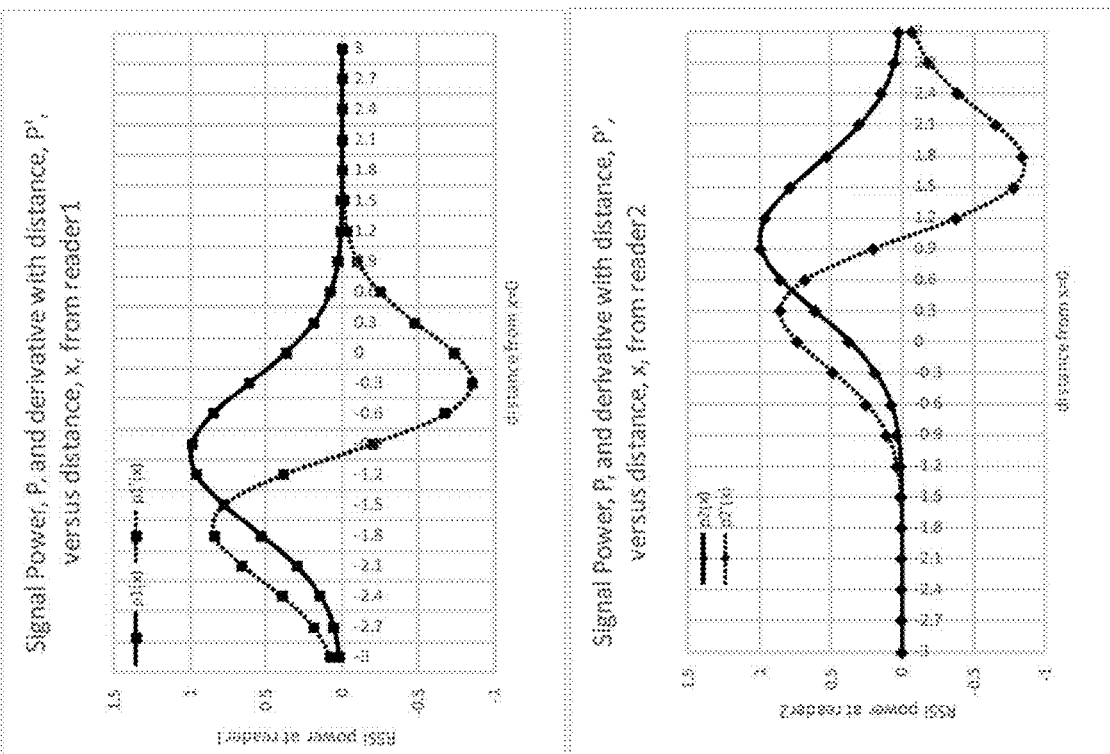
FIG. 8A is a graph illustrating the derivative of power of the response signal illustrated in FIG. 7A relative to the distance from RFID reader 1 in FIG. 6.
FIG. 8B is a graph illustrating the derivative of power of the response signal illustrated in FIG. 7B relative to the distance from RFID reader 2 in FIG. 6.

As the RFID tag in the portable electronic device moves, the derivative of power with respect to distance is shown in FIGS. 8A and 8B. FIG. 8A shows the signal power, P, and derivative with distance, P', versus distance, x, from Reader 1. FIG. 8B shows the shows the signal power, P, and derivative with distance, P', versus distance, x, from Reader 2.

If the RFID tag in the portable electronic device is moving in time, then the position x is a function of time, x(t). Therefore, the power measured by the readers as a function of time are, P1(x1(t)) and P2(x2(t)), where x1 is the distance from reader 1, and x2 is the distance from reader 2. Using a calculus identity, the derivative of power with respect to time measured by each reader is:

$dP1/dt=dP1/dx1*dx1/dt$ and $dP2/dt=dP2/dx2*dx2/dt.$

If the velocity of the tag moving from one district another district is a relative constant, v, then the relative power and derivative of power with respect to time measured by each reader is:

$P1(t)=P1(v*t+1), P2(v*t-1), dP1/dt=dP1/dx1*v, dP2/dt=dP2/dx2*v.$

Figure 9:
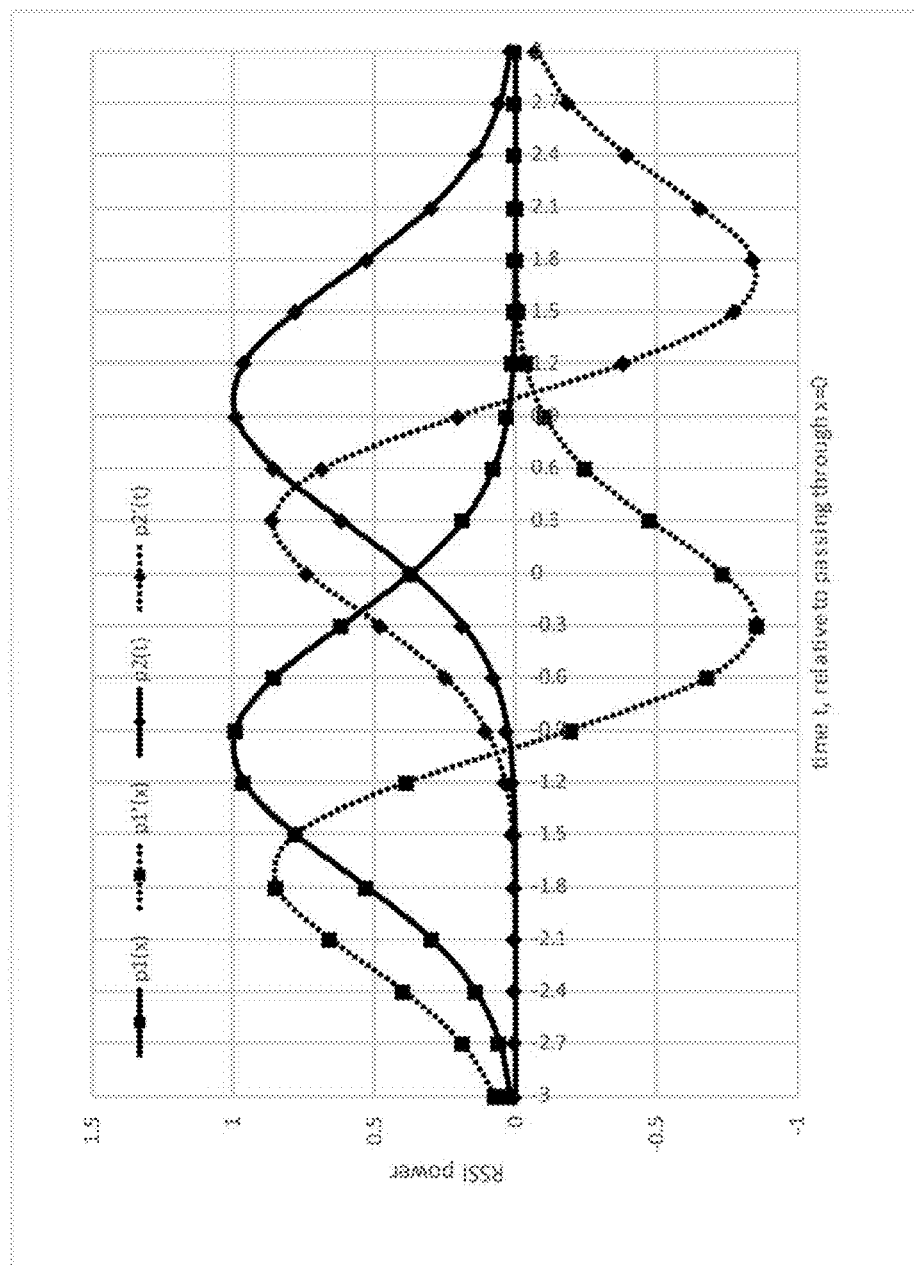
FIG. 9 is a graph comparing the powers of the response signals illustrated in FIGS. 6A and 6B with their derivatives as illustrated in FIGS. 7A and 7B over time as the portable electronic device moves between the RFID readers.

FIG. 9 shows the reader signals and time derivatives for constant velocity motion from district 1 to district 2.

Based on the above, the processor 414 of the controller 130 is configured to execute an algorithmic computer program, which is stored in the non-transitory memory 412, to determine RFID tag motion from district 1 to district 2, for an RFID tag moving from district 1 to district 2 at a relatively constant velocity, by measuring the power with respect to time and the first derivative, with the following algorithmic parameters:

1) Both readers sample the RSSI power periodically in time. Based on the sampling, the derivative of dP/dt is calculated. Assume a tag approaches the district boundary from the region of district 1 (e.g., from the region to the left of the graphs in FIGS. 7A-9).

2) Initially, the signal and derivative of reader 1 will increase (event 1).

3) As the RFID tag moves closer to the boundary between district 1 and district 2 (x=0), the derivative of the signal at reader 1 will go through a maximum and then pass through zero, the zero passing being an easily detectable event (event 2).

4) As the RFID tag continues to move closer to the boundary (x=0), the derivative of the signal at reader 1 will begin to decrease less than zero, and the signal and time derivative at reader 2 will increase (event 3).

5) As the RFID tag moves toile district 2 side of the boundary (x=0), the time derivative of the signal at reader 2 will pass through zero, and the signal at reader 2 will be at a maximum (event 4).

6) As the RFID tag continues to move into district 2, the derivative of the signal at reader 2 will pass through zero becoming less than zero, and the signal at reader 2 will decrease (event 5).

7) After event 5, when the signal from the RFID tag drops to a predetermined level relative to the maximum signal received at reader 2 (e.g., less than 50%), then the tag will be provisioned by the controller 130 for operation in district 2 (event 6). A valid motion from district1 to district2 will be when events 1 through 6 occur in order.

The controller 130 is also configured to make other determinations based on the movement of the RFID tag and the resultant response signals received by the RFID readers. For example, if the RFID tag stops, there will be discontinuity in either reader's dP/dt, (e.g., dP/dt suddenly goes to zero), or if the RFID reverses motion, in which case there will be discontinuity and a sign change of both reader's dP/dt. In this way, the controller 130 continuously validates whether the portable electronic device enters, leaves or remains in a particular district or area over a period of time (e.g., times 1-5 as illustrated in FIGS. 1A-1E). It is to be understood that FIGS. 1A-1E are intended to be examples, and the controller 130 can continuously validate whether the portable electronic device (or multiple portable electronic devices) enter, leave or remain in a particular district or area over any period of time.

Referring back to the example of FIGS. 1A-1E, at least one of the first RFID reader 110 and the second RFID reader 120 comprises an elliptical or circularly polarized antenna such that the at least one of the first RFID reader 110 and the second RFID reader 120 respectively transmits the corresponding one of the first location signal 112 and the second location signal 122 in orthogonal polarizations in the corresponding first and second locations, respectively.

According to the exemplary system 100 in FIGS. 1A-1E, the first RFID reader (e.g., RFID reader 110) is arranged on a first side of a room of a building, and the second RFID reader (e.g., RFID reader 120) is arranged on a second side of the room distinct from the first side of the room. According to another example, the first RFID reader is arranged in a room of a building (e.g., RFID reader 110), and the second RFID reader (e.g., RFID reader is arranged in a hallway outside the room of the building. In this example, the controller 130 is configured to determine whether the portable electronic device is transported from the hallway into the room, and whether the portable electronic device is transported from the room into the hallway.

Exemplary embodiments of the present disclosure were described above with respect to an example of first and second RFID readers (e.g., RFID readers 110 and 120). The present disclosure is not limited to this example. As illustrated in FIGS. 1A-1E, the exemplary system 100 can include three or more RFID readers. For example, the exemplary system 100, in addition to RFID readers 110 and 120, can include a third RFID reader (e.g., any one of readers 172, 176, 178 and 180 in FIGS. 1A-1E) arranged in the hallway at a third location distinct from the first and second locations. The third RFID reader (e.g., RFID reader 176) is configured to transmit a third location signal (e.g., location signal 177) from the third location, and to receive a third response signal (e.g., response signal 177R illustrated in FIG. 1D) from the portable electronic device when the portable electronic device is within range of the third location to receive the third location signal 177. In addition, in this example, the controller 130 is configured to determine whether the portable electronic device is closer to one of the first RFID reader 110, the second RFID reader 120 and the third RFID reader (e.g., RFID reader 176) at the first and second times, respectively, based on an amount of power respectively present in the first response signal 114 received by the first RFID reader 110, the second response signal 124 received by the second RFID reader 120, and the third response signal received by the third RFID reader (e.g., RFID reader 176) at the first and second times, respectively.

In accordance with the above-described exemplary embodiment, the controller 130 is configured to compare the amount of power respectively present in the first response signal 114 received by the first RFID reader 110, the second response signal 124 received by the second RFID reader 120, and the third response signal received by the third RFID reader (e.g., RFID reader 176) at the first and second times, respectively, and to determine whether the portable electronic device is closer to one of the first RFID reader 110, the second RFID reader 120 and the third RFID reader (e.g., RFID reader 176) at the first and second times based on which one of the first response signal 114, the second response signal 124 and the third response signal has the greatest amount of power at the first and second time, respectively.

As illustrated in FIGS. 1A-1E, in the exemplary system 100 of the present disclosure, the first RFID reader (e.g., RFID reader 110) is arranged in a first district of a building, and the second RFID reader (e.g., any of the readers not in district 1 in FIGS. 1A-1E) is arranged in a second district of the building distinct from the first district. In accordance with this embodiment, the first district is a room in the building, and the second district is a hallway outside the room. Further, as described above, the first district may be located on a different floor of the building than the second district.

In accordance with an exemplary embodiment, the controller 130 is configured to determine an amount of time that the portable electronic device is present in at least one of the first and second locations (e.g., locations of RFID readers 110, 120) based on the first and second response signals 114, 124 over a period of time.

According to an exemplary embodiment, the controller 130 is configured to control the first RFID reader (e.g., RFID reader 110) to transmit a first authorization signal to the portable electronic device when the first RFID reader (e.g., RFID reader 110) receives the first response signal 114 from the portable electronic device. The first authorization signal authorizes the portable electronic device to execute a first set of operations while the portable electronic device receives the first location signal. For example, the first authorization signal can authorize the portable electronic device to have access to certain data or to have access to hardware components of the portable electronic device (e.g., camera) or external hardware components while the portable electronic device is present in the first location and receives the first location signal. In addition, the controller 130 is configured to control the second RFID reader 120 to transmit a second authorization signal to the portable electronic device when the second RFID reader 120 receives the second response signal 124 from the portable electronic device. Similar to the first authorization signal, the second authorization signal authorizes the portable electronic device to execute a second set of operations (e.g., access data and/or hardware components) while the portable electronic device receives the second location signal. This authorization procedure in two different locations facilitates authorization of distinct operations of the portable electronic device when the portable electronic device moves from one location to another. For example, suppose the building illustrated in FIGS. 1A-1E is a hospital or other medical building, where Districts 1-4 are patient rooms, and District H is the hallway. In accordance with the above-described embodiment, the controller 130 can control the first RFID reader 110 to transmit a first authorization signal when the first RFID reader 110 receives the first response signal 114 from the portable electronic device, after the RFID reader 176 stops receiving the response signal 177R, consistent with the portable electronic device being moved from the hallway (District H) into the patient room (e.g., District 1). In this way, the controller 130 can authorize a medical professional transporting the portable electronic device to have access to a particular patient's medical records on the portable electronic device when the portable electronic device is detected to move into and be present in District 1. When the medical professional carrying the portable electronic device leaves District 1 and returns to District H, the portable electronic device will receive a location signal (as well as an authorization signal) from RFID reader(s) in District H (e.g., location signal 177 from RFID reader 176) but will no longer receive an authorization signal from the RFID reader(s) in District 1, in which case the portable electronic device will then not be authorized to access (or continue to access) the medical records of the patient in District 1. Similarly, the controller 130, by sending such authorization signal(s) to the portable electronic device when it is detected to be located in a particular district or area, can enable/disable the portable electronic device to have access to certain data or access to hardware components of the portable electronic device (e.g., camera) or external hardware components while the portable electronic device is present in that district and receives an authorization signal while in that district.

According to an exemplary embodiment, the controller 130 is configured to modify at least one of the first set of operations and the second set of operations. According to an exemplary embodiment, the first RFID reader (e.g., RFID reader 110) transmits the first location signal (e.g., location signal 112) at a first frequency, and the second RFID reader (e.g., RFID reader 120) transmits the second location signal at a second frequency different from the first frequency. The controller 130 is configured to control the first RFID reader (e.g., RFID reader 110) to transmit a first authorization signal to the portable electronic device when the first RFID reader (e.g., RFID reader 110) receives the first response signal 114 from the portable electronic device at the first frequency. The first authorization signal authorizes the portable electronic device to execute a first set of operations while the portable electronic device receives the first location signal 112, as described above. Similarly, the controller 130 is configured to control the second RFID reader (e.g., RFID reader 120) to transmit a second authorization signal to the portable electronic device when the second RFID reader (e.g., RFID reader 120) receives the second response signal 124 from the portable electronic device at the second frequency, the second authorization signal authorizing the portable electronic device to execute a second set of operations while the portable electronic device receives the second location signal. According to an exemplary embodiment, the controller 130 is configured to control the first and second RFID readers (e.g., RFID readers 110, 120) to respectively change the first and second frequencies at a predetermined time.

According to an exemplary embodiment, the RFID readers of the exemplary system 100 are configured to operate in the 900 MHz ISM frequency space. For instance, the North American ISM band is 902-928 MHz. In this example, the RFID readers are configured to operate in this band to regulatory reasons. However, it is to be understood that the RFID readers can be configured to operate in other frequency ranges. The portable electronic device of the present disclosure includes an RFID component (e.g., RFID tag) that communicates with the RFID readers in the frequency band in which the RFID readers are configured to operate. For example, the RFID component of the portable electronic device can operate in a frequency range between 860 and 960 MHz. The sensitivity of the antenna of the RFID component is important to the operation of the RFID component, and a minimum receive gain of the antenna greater than −2 dB should be maintained to ensure proper operation. In accordance with an exemplary embodiment, the antenna(s) of the RFID component of the portable electronic device provides a roughly omni-directional radiation pattern. Due to regional banding of the ~900 MHz ISM frequency space, the antenna(s) may be regionally designed. For instance, the North American ISM band is 902-928 MHz. With a transmitter at 28 dBm complying with FCC and UHF RFID Gen2 Specifications, this should yield a free space range of approximately 20 meters.

According to an exemplary embodiment, the RFID component can be removably or fixedly affixed to the portable electronic device. FIG. 2 is a block diagram illustrating the hardware architecture of a portable electronic device 200 in accordance with an exemplary embodiment. In the example of FIG. 2, the RFID component 210 is illustrated as being comprised within the housing containing the electronic circuitry of the portable electronic device 200. In accordance with an exemplary embodiment, the RFID component 210 may have its own hardware processor 214 separate from the hardware processor(s) of the portable electronic device 200. In addition, the RFID component 210 has its own non-transitory memory 212 (e.g., ROM, hard disk drive, optical memory, flash memory, etc.) separate from the memory 208 of the portable electronic device 200, and a transceiver 220. In an exemplary embodiment, the RFID component 210 does not have its own hardware processor 214, but contains the memory 212 and the transceiver 220. The RFID component 210 may be passive, active, or battery-assisted passive. An active RAID component 210 has an on-board battery and periodically transmits a signal containing a data message (the message can include, e.g., identification information of the RFID component, etc.). A battery-assisted passive RFID component 210 has a small battery on board and is activated when in the presence of an RFID reader 100. A passive RFID component 210 is cheaper and smaller because it has no battery; instead, the RFID component 210 uses the radio energy transmitted by the RFID reader 100. The RFID component 210 contains at least two parts: an integrated circuit for storing and processing information, modulating and demodulating a radio-frequency (RF) signal, collecting DC power from the incident reader signal, and other specialized functions; and a transceiver 220 (e.g., antenna) for receiving and transmitting the signal. In an exemplary embodiment, the transceiver 220 can include two antennas in different polarizations such as linear and circular or horizontal and vertical. A single antenna can also be used.

According to an exemplary embodiment, the RFID component 210 can be configured to store RFID component Information (i.e. tag information) in a non-volatile memory, e.g., memory 212. The RFID component 210 includes either fixed or programmable logic for processing the transmission and sensor data, respectively. In an exemplary embodiment, the RFID component 210 includes an Impinj MonzaX-8K Dura RFID integrated circuit or similar integrated circuit. As will be described in more detail below, the RFID component 210 of the portable electronic device can be configured to transmit a response signal to an RFID reader in the exemplary system 100 when the portable electronic device is within range of the location of the RFID reader to receive the location signal from that RFID reader. In accordance with an exemplary embodiment, the RFID component 210 of the portable electronic device can be configured to transmit, with its response signal, the component information of the RFID component 210 to the RFID reader from which the RFID component 210 received the location signal. The RFID reader that receives the RFID component information from the portable electronic device can then, in turn, store the received RFID component information in its memory (see FIG. 3) and transmit it to the controller 130.

With continued reference to FIG. 2, hardware processor 204 of the portable electronic device may be a special purpose or a general-purpose processor device. Hardware processor 214 may be a special purpose or a general-purpose processor device. The hardware processor device 204 may be connected to a communication infrastructure 206, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The portable electronic device 200 may also include a memory 208 (e.g., random access memory, read-only memory, etc.), and may also include a memory 212. The memory 208 and the memory 212 may be read from and/or written to in a well-known manner. In accordance with an exemplary embodiment, the memory 208 and the memory 212 (and memories 317 and 327 of the RFID readers in FIG. 3) are non-transitory computer readable recording media (e.g., ROM, hard disk drive, flash memory, optical memory, solid-state drive, etc.). A hardware processor device as discussed herein may be a single hardware processor, a plurality of hardware processors, or combinations thereof. Hardware processor devices may have one or more processor "cores."

Data stored in the portable electronic device 200 (e.g., in the memory 208 and the memory 212) may be stored on any type of suitable computer readable media, such as optical storage (e.g., a compact disc, digital versatile disc, Blu-ray disc, etc.), magnetic tape storage (e.g., a hard disk drive), or solid-state drive. An operating system 232, one or more applications 234, and one or more hypervisors 236 can be stored in the memory 208.

The portable electronic device 200 may also include a communications interface 224. The communications interface 224 may be configured to allow software and data to be transferred between the portable electronic device 200 and external devices. Exemplary communications interfaces 224 may include a wireless modem (e.g., transceiver), a network interface (e.g., an Ethernet card), a communications port, a PCMCIA slot and card, etc. Software and data may be transferred via the communications interface 224 to external devices.

The memories 208 and 212, which are non-transitory computer-readable recording media, may store operating systems and/or computer programs to be executed by the portable electronic device 200. Computer programs may also be received via the communications interface 224. Such computer programs, when executed may enable the portable electronic device 200 to implement its operative functions that may be controlled, as discussed herein, based on the detected location of the portable electronic device. For instance, the operating system and/or computer programs, when executed, may enable hardware processor device 204 to access or operate hardware components such as the camera 216, the microphone 218, the peripheral interface 222, the USB/Firewire/Thunderbolt interface ports 228, and/or the display 230 (e.g., LED screen, touch screen, etc.).

In accordance with the examples of FIGS. 1A and 1B, an exemplary embodiment of the present disclosure provides the system in combination with a portable electronic device, wherein the portable electronic device comprises an RFID tag (210 in FIG. 2) configured to transmit the first response signal 114 when the portable electronic device is within range of the first location to receive the first location signal 112, and to transmit the second response signal 124 when the portable electronic device is within range of the second location to receive the second location signal 122. According to an exemplary embodiment, the RFID tag 210 is a passive tag configured to transmit the first response signal 114 in response to receiving the first location signal 112 when the portable electronic device is within range of the first location to receive the first location signal 112, and to transmit the second response signal 124 in response to receiving the second location signal 122 when the portable electronic device is within range of the second location to receive the second location signal 122.

In accordance with an exemplary embodiment, the RFID tag comprises a unique identifier (e.g., a MAC ID of the RFID component or other uniquely assigned identifier). The RFID tag is configured to transmit the first response signal 114 to the first RFID reader 110 by modulating the first location signal 112 with the unique identifier of the RFID tag and transmitting the modulated first location signal with the unique identifier of the RFID tag. In addition, the RFID tag is configured to transmit the second response signal 124 to the second RFID reader 120 by modulating the second location signal 122 with the unique identifier of the RFID tag and transmitting the modulated second location signal with the unique identifier of the RFID tag. In this way, the controller 130 can determine the location of individual portable electronic devices based on the unique identifier of the RFID tag of the portable electronic device. The controller 130 can then authorize or prevent an individual portable electronic device from performing certain operations based on the motion of the portable electronic device from one district to another as well as the current location of that portable electronic device.

According to an exemplary embodiment, the RFID tag is an active tag having a unique identifier, and the portable electronic device includes a battery power source configured to supply power to the RFID tag. In accordance with this embodiment, the RFID tag is configured to generate and transmit the first response signal 114 to the first RFID reader 110 when the portable electronic device is within range of the first location, where the first response signal 114 contains the unique identifier of the RFID tag. In addition, the RFID tag is configured to generate and transmit the second response signal 124 to the second RFID reader when the portable electronic device is within range of the first location, where the second response signal 124 contains the unique identifier of the RFID tag. Similar to the above-described embodiment where the RFID tag is a passive tag, the controller 130 can authorize or prevent an individual portable electronic device with an active RFID tag having a unique identifier from performing certain operations based on the motion of the portable electronic device from one district to another as well as the current location of that portable electronic device and the unique identifier of the RFID tag.

According to an exemplary embodiment, the portable electronic device includes at least one processor 204, 214 and at least one memory 208, 212 having recorded thereon operation instructions that the at least one processor executes to perform operations of the at least one portable electronic device. In accordance with this embodiment, the controller 130 is configured to control at least one operation of the portable electronic device by authorizing or disallowing the at least one operation to be executed by the at least one processor of the portable electronic device based on whether at least one of (i) the first RFID reader 110 receives the first response signal (114) from the portable electronic device, and (ii) the second RFID reader 120 receives the second response signal 124 from the portable electronic device.

According to an exemplary embodiment, the controller 130 is configured to control the first RFID reader 110 to transmit a first authorization signal to the portable electronic device when the first RFID reader 110 receives the first response signal 114 from the portable electronic device. The first authorization signal authorizes the at least one processor of the portable electronic device to execute a first set of operations, as described above. The controller 130 is configured to control the second RFID reader 120 to transmit a second authorization signal to the portable electronic device when the second RFID reader 120 receives the second response signal 124 from the portable electronic device. The second authorization signal authorizes the at least one processor of the portable electronic device to execute a second set of operations, which at least partially differ from the first set of operations. The at least one processor of the portable electronic device is configured to execute the first set of operations when the RFID tag of the portable electronic device receives the first authorization signal. The at least one processor of the portable electronic device is configured to execute the second set of operations when the RFID tag of the portable electronic device receives the second authorization signal.

In accordance with the above-described exemplary embodiment, the at least one processor of the portable electronic device is configured to execute the first set of operations while the RFID tag of the portable electronic device receives the first location signal 112 when the portable electronic device is in the first location. In addition, the at least one processor of the portable electronic device is configured to execute the second set of operations while the RFID tag of the portable electronic device receives the second location signal 122 when the portable electronic device is in the second location.

In accordance with an exemplary embodiment, the at least one processor of the portable electronic device is configured to authenticate the controller 130 when the RFID tag receives the first authorization signal, and control the RFID tag to transmit a first authentication signal to the controller 130 upon authenticating the controller 130. In addition, the at least one processor of the portable electronic device is configured to authenticate the controller 130 when the RFID tag receives the second authorization signal, and control the RFID tag to transmit a second authentication signal to the controller 130 upon authenticating the controller 130.

Figure 10:
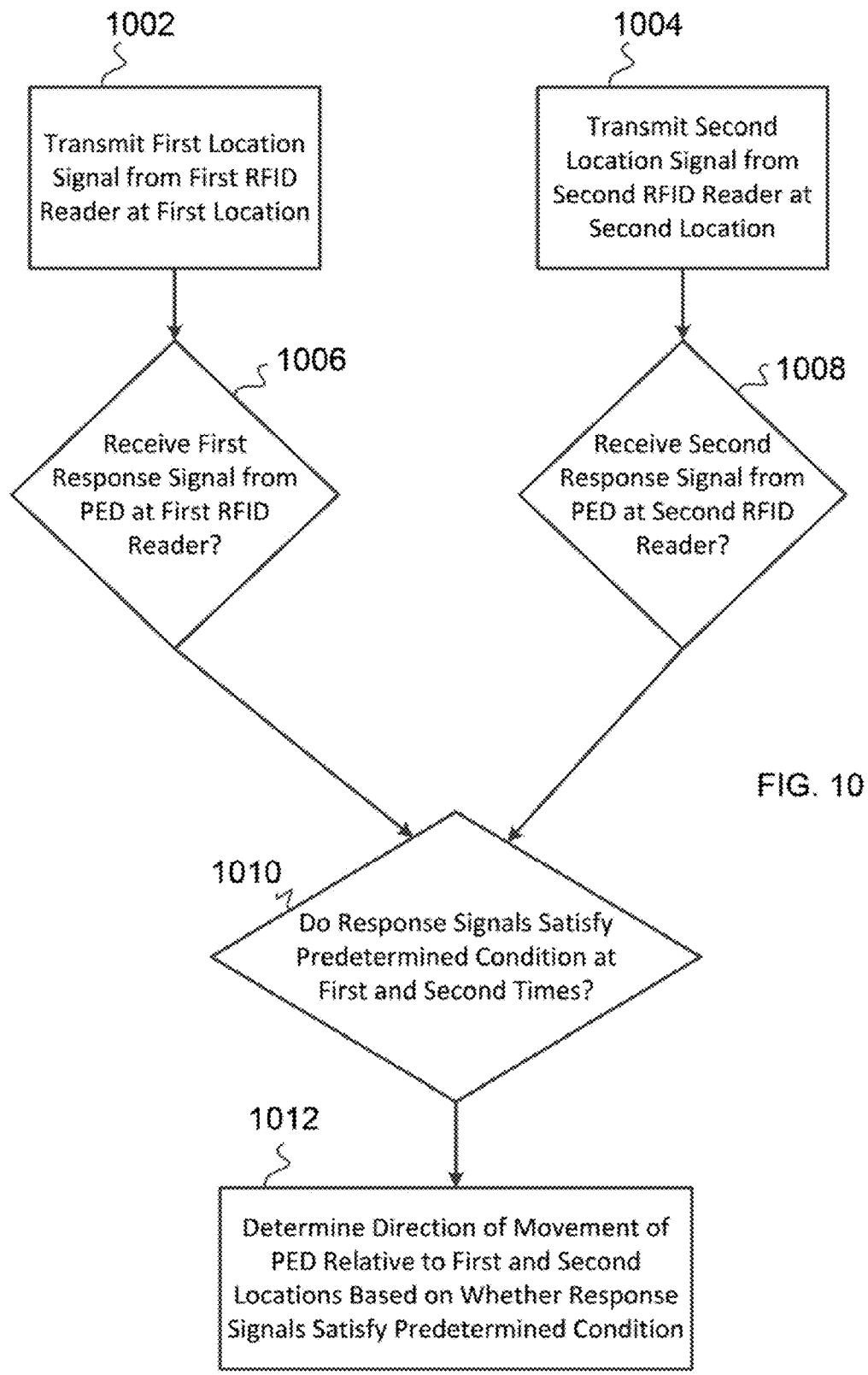
FIG. 10 is a flowchart illustrating a method of detecting direction of movement of a portable electronic device using RFID readers, according to an exemplary embodiment.

An exemplary embodiment of the present disclosure provides a method of detecting direction of movement. The features of the above-described embodiments of the system of the present disclosure can be implemented in the method of the present disclosure. FIG. 10 illustrates a flow diagram of an exemplary embodiment of the method. In step 1002, a first RFID reader (e.g., reader 110 in FIGS. 1A-1E) arranged in a first location (e.g., the lower wall in District 1) transmits a first location signal (e.g., location signal 112) from the first location. In step 1004, a second RFID reader (e.g., reader 176 in FIGS. 1A-1E) arranged in a second location (e.g., far wall in District H) transmits a second location signal (e.g., location signal 177) from the second location. In step 1006, the first RFID reader receives a first response signal (e.g., response signal 114 in FIG. 1A) from a portable electronic device (PED) when the portable electronic device is within range of the first location to receive the first location signal transmitted by the first RFID reader. In step 1008, the second RFID reader receives a second response signal (e.g., response signal 177R in FIG. 1D) from the portable electronic device when the portable electronic device is within range of the second location to receive the second location signal transmitted by the second RFID reader. In step 1010, a hardware processor of a controller (e.g., processor unit 402 of controller 130 in FIG. 4) determines whether the first and second response signals received, by the first and second RFID readers respectively satisfy a predetermined condition at a first time and a second time subsequent to the first time. In step 1012, the hardware processor of the controller determines a direction of movement of the portable electronic device relative to the first and second locations during the first and second times based on the determination of whether the first and second response signals respectively satisfy the predetermined condition at the first and second times.

In accordance with an exemplary embodiment of the method of the present disclosure, the controller includes a transceiver (e.g., transceiver/interface 406 in FIG. 4) that receives the first response signal from the first RFID reader and receives the second response signal from the second RFID reader.

In accordance with an exemplary embodiment of the method of the present disclosure, the above-described predetermined condition is a threshold of power present in the first and second response signals respectively received by the first and second RFID readers. In accordance with this, embodiment, the exemplary method includes determining by the processor of the controller, whether the portable electronic device is present in the first location at the first and second times based on the power present in the first response signal received by the first RFID reader at the first and second times, respectively. In addition, the exemplary method includes determining, by the processor of the controller, whether the portable electronic device is present in the second location at the first and second times based on the power present in the second response signal received by the second RFID reader at the first and second times, respectively.

In accordance with an exemplary embodiment of the method of the present disclosure, the method includes determining, by the processor of the controller, the direction of movement of the portable electronic device relative to the first and second locations by (i) comparing the respective powers present in the first and second response signals at the first time relative to the respective powers present in the first and second response signals at the second time, and (ii) determining the direction of movement of the portable electronic device relative to the first and second locations based on the comparison of the respective powers present in the first and second response signals at the first and second times.

In accordance with an exemplary embodiment of the method of the present disclosure, the first RFID reader, upon receiving the first response signal, measures power present in the first response signal received by the first RFID reader, generates a first received signal strength indicator (RSSI) signal indicating the measured power in the first response signal, and transits the first RSSI signal to the controller. In addition, the second RFID reader, upon receiving the second response signal, measures power in the second response signal received by the second RFID reader, generates a second RSSI signal indicating the measured power in the second response signal, and transmits the second RSSI signal to the controller when the second RFID reader receives the second response signal. In accordance with this embodiment, the processor of the controller determines an amount of power present in the first response signal based on the first RSSI signal received from the first RFID reader, and determines an amount of power present in the second response signal based on the second PSI signal received from the second RFID reader.

In accordance with an exemplary embodiment of the method of the present disclosure, the above-described predetermined condition is a threshold value of the amount of power present in the first and second response signals respectively received by the first and second RFID readers. The exemplary method includes determining, by the processor of the controller, whether the portable electronic device is present in the first location at the first and second times based on the power present in the first response signal received by the first RFID reader at the first and second times, respectively. In addition, the exemplary method includes determining, by the processor of the controller, whether the portable electronic device is present in the second location at the first and second times based on the power present in the second response signal received by the second RFID reader at the first and second times, respectively.

It is to understood that any of the features of the above-described system of the present disclosure can be performed in the method of the present disclosure, and vice versa.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description, and all changes that come within the meaning, range and equivalence thereof are intended to be embraced in the claims.

What is claimed is:

1. A system for detecting direction of movement, the system comprising:
 a first radio frequency identification (RFID) reader arranged in a first location, the first RFID reader being configured to transmit a first location signal from the first location, and to receive a first response signal from a portable electronic device when the portable electronic device is within range of the first location to receive the first location signal;
 a second RFID reader arranged in a second location distinct from the first location, the second RFID reader being configured to transmit a second location signal from the second location, and to receive a second response signal from the portable electronic device when the portable electronic device is within range of the second location to receive the second location signal; and
 a controller configured to determine whether the first and second response signals received by the first and second RFID readers respectively satisfy a predetermined condition at a first time and a second time subsequent to the first time, and to determine a direction of movement of the portable electronic device relative to the first and second locations during the first and second times based on whether the first and second response signals respectively satisfy the predetermined condition at the first and second times,
 wherein the first RFID reader comprises a first power measurement unit configured to measure power present in the first response signal received by the first RFID reader, a first control unit configured to generate a first received signal strength indicator (RSSI) signal indicating the measured power in the first response signal, and a first transceiver configured to transmit the first RSSI signal to the controller when the first RFID reader receives the first response signal,
 wherein the second RFID reader comprises a second power measurement unit configured to measure power in the second response signal received by the second RFID reader, a second control unit configured to generate a second RSSI signal indicating the measured power in the second response signal, and a second transceiver configured to transmit the second RSSI signal to the controller when the second RFID reader receives the second response signal, and
 wherein the controller is configured to determine an amount of power present in the first response signal based on the first RSSI signal received from the first RFID reader, and to determine an amount of power present in the second response signal based on the second RSSI signal received from the second RFID reader.

2. The system of claim 1, wherein the predetermined condition is a threshold of power present in the first and second response signals respectively received by the first and second RFID readers,
 wherein the controller is configured to determine whether the portable electronic device is present in the first location at the first and second times based on the power present in the first response signal received by the first RFID reader at the first and second times, respectively, and
 wherein the controller is configured to determine whether the portable electronic device is present in the second location at the first and second times based on the power present in the second response signal received by the second RFID reader at the first and second times, respectively.

3. The system of claim 2, wherein the controller is configured to determine the direction of movement of the portable electronic device relative to the first and second locations by comparing the respective powers present in the first and second response signals at the first time relative to the respective powers present in the first and second response signals at the second time, and determining the direction of movement of the portable electronic device relative to the first and second locations based on the comparison of the respective powers present in the first and second response signals at the first and second times.

4. The system of claim 3, wherein the controller is configured to:
 determine whether the portable electronic device is closer to the first location or the second location at the first time by comparing the power present in the first response signal to the power present in the second response signal at the first time, determining that the portable electronic device is closer to the first location at the first time when the power present in the first response signal is greater than the power present in the second response signal at the first time, and determining that the portable electronic device is closer to the second location at the first time when the power present in the second response signal is greater than the power present in the first response signal at the first time;

determine whether the portable electronic device is closer to the first location or the second location at the second time by comparing the power present in the first response signal to the power present in the second response signal at the second time, determining that the portable electronic device is closer to the first location at the second time when the power present in the first response signal is greater than the power present in the second response signal at the second time, and determining that the portable electronic device is closer to the second location at the second time when the power present in the second response signal is greater than the power present in the first response signal at the second time; and determine the direction of movement of the portable electronic device by determining whether the portable electronic device is closer to the first location or the second location at the first time, determining whether the portable electronic device is closer to the first location or the second location at the second time, and deriving the direction of movement of the portable electronic device based on the determinations of whether the portable electronic device is closer to the first location or the second location at the first and second times, respectively.

5. The system of claim 1, wherein the predetermined condition is a threshold value of the amount of power present in the first and second response signals respectively received by the first and second RFID readers, wherein the controller is configured to determine whether the portable electronic device is present in the first location at the first and second times based on the power present in the first response signal received by the first RFID reader at the first and second times, respectively, and wherein the controller is configured to determine whether the portable electronic device is present in the second location at the first and second times based on the power present in the second response signal received by the second RFID reader at the first and second times, respectively.

6. The system of claim 5, wherein the controller is configured to determine the direction of movement of the portable electronic device relative to the first and second locations by comparing the respective powers present in the first and second response signals at the first time relative to the respective powers present in the first and second response signals at the second time, and determining the direction of movement of the portable electronic device relative to the first and second locations based on the comparison of the respective powers present in the first and second response signals at the first and second times.

7. The system of claim 6, wherein the controller is configured to:

determine whether the portable electronic device is closer to the first location or the second location at the first time by comparing the power present in the first response signal to the power present in the second response signal at the first time, determining that the portable electronic device is closer to the first location at the first time when the power present in the first response signal is greater than the power present in the second response signal at the first time, and determining that the portable electronic device is closer to the second location at the first time when the power present in the second response signal is greater than the power present in the first response signal at the first time;

determine whether the portable electronic device is closer to the first location or the second location at the second time by comparing the power present in the first response signal to the power present in the second response signal at the second time, determining that the portable electronic device is closer to the first location at the second time when the power present in the first response signal is greater than the power present in the second response signal at the second time, and determining that the portable electronic device is closer to the second location at the second time when the power present in the second response signal is greater than the power present in the first response signal at the second time; and determine the direction of movement of the portable electronic device by determining whether the portable electronic device is closer to the first location or the second location at the first time, determining whether the portable electronic device is closer to the first location or the second location and the second time, and deriving the direction of movement of the portable electronic device based on the determinations of whether the portable electronic device is closer to the first location or the second location at the first and second times, respectively.

8. The system of claim 1, wherein at least one of the first RFID reader and the second RFID reader comprises an elliptical or circularly polarized antenna such that the at least one of the first RFID reader and the second RFID reader respectively transmits the corresponding one of the first location signal and the second location signal in orthogonal polarizations in the corresponding first and second locations, respectively.

9. The system of claim 8, wherein the first RFID reader is arranged on a first side of a room of a building, and the second RFID reader is arranged on a second side of the room distinct from the first side of the room.

10. A system for detecting direction of movement, the system comprising:

a first radio frequency identification (RFID) reader arranged in a first location, the first RFID reader being configured to transmit a first location signal from the first location, and to receive a first response signal from a portable electronic device when the portable electronic device is within range of the first location to receive the first location signal;

a second RFID reader arranged in a second location distinct from the first location, the second RFID reader being configured to transmit a second location signal from the second location, and to receive a second response signal from the portable electronic device when the portable electronic device is within range of the second location to receive the second location signal; and a controller configured to determine whether the first and second response signals received by the first and second RFID readers respectively satisfy a predetermined condition at a first time and a second time subsequent to the first time, and to determine a direction of movement of the portable electronic device relative to the first and second locations during the first and second times based on whether the first and second response signals respectively satisfy the predetermined condition at the first and second times, wherein at least one of the first RFID reader and the second RFID reader comprises an elliptical or circularly polarized antenna such that the at least one of the first RFID reader and the second RFID reader respectively transmits the corresponding one of the first location signal and the second location signal in orthogonal polarizations in the corresponding first and second locations, respectively, wherein the first RFID reader is arranged in a room of a building, and the second RFID reader is arranged in a hallway outside the room of the building, and wherein the controller is configured to determine whether the portable electronic device is transported from the hallway into the room, and whether the portable electronic device is transported from the room into the hallway.

11. The system of claim 10, comprising:
a third RFID reader arranged in the hallway at a third location distinct from the first and second locations, the third RFID reader being configured to transmit a third location signal from the third location, and to receive a third response signal from the portable electronic device when the portable electronic device is within range of the third location to receive the third location signal, wherein the controller is configured to determine whether the portable electronic device is closer to one of the first RFID reader, the second RFID reader and the third RFID reader at the first and second times, respectively, based on an amount of power respectively present in the first response signal received by the first RFID reader, the second response signal received by the second RFID reader, and the third response signal received by the third RFID reader at the first and second times, respectively.

12. The system of claim 11, wherein the controller is configured to compare the amount of power respectively present in the first response signal received by the first RFID reader, the second response signal received by the second RFID reader, and the third response signal received by the third RFID reader at the first and second times, respectively, and to determine whether the portable electronic device is closer to one of the first RFID reader, the second RFID reader and the third RFID reader at the first and second times based on which one of the first response signal, the second response signal and the third response signal has the greatest amount of power at the first and second times, respectively.

13. The system of claim 1, wherein the controller is configured to determine an amount of time that the portable electronic device is present in at least one of the first and second locations based on the first and second response signals over a period of time.

14. The system of claim 1, in combination with a portable electronic device, wherein the portable electronic device comprises an RFID tag configured to transmit the first response signal when the portable electronic device is within range of the first location to receive the first location signal, and to transmit the second response signal when the portable electronic device is within range of the second location to receive the second location signal.

15. The system of claim 14, wherein the RFID tag is a passive tag configured to transmit the first response signal in response to receiving the first location signal when the portable electronic device is within range of the first location to receive the first location signal, and to transmit the second response signal in response to receiving the second location signal when the portable electronic device is within range of the second location to receive the second location signal, wherein the RFID tag comprises a unique identifier, wherein the RFID tag is configured to transmit the first response signal to the first RFID reader by modulating the first location signal with the unique identifier of the RFID tag and transmitting the modulated first location signal with the unique identifier of the RFID tag, and wherein the RFID tag is configured to transmit the second response signal to the second RFID reader by modulating the second location signal with the unique identifier of the RFID tag and transmitting the modulated second location signal with the unique identifier of the RFID tag.

16. The system of claim 14, wherein the RFID tag is an active tag having a unique identifier, and the portable electronic device comprises a battery power source configured to supply power to the RFID tag, wherein the RFID tag is configured to generate and transmit the first response signal to the first RFID reader when the portable electronic device is within range of the first location, the first response signal containing the unique identifier of the RFID tag, and wherein the RFID tag is configured to generate and transmit the second response signal to the second RFID reader when the portable electronic device is within range of the first location, the second response signal containing the unique identifier of the RFID tag.

17. The system of claim 14, wherein the portable electronic device comprises at least one processor and at least one memory having recorded thereon operation instructions that the at least one processor executes to perform operations of the at least one processor of the portable electronic device, wherein the controller is configured to control at least one operation of the portable electronic device by authorizing or disallowing the at least one operation to be executed by the at least one processor of the portable electronic device based on whether at least one of (i) the first RFID reader receives the first response signal from the portable electronic device and (ii) the second RFID reader receives the second response signal from the portable electronic device.

18. The system of claim 14, wherein the controller is configured to control the first RFID reader to transmit a first authorization signal to the portable electronic device when the first RFID reader receives the first response signal from the portable electronic device, the first authorization signal authorizing the at least one processor of the portable electronic device to execute a first set of operations, wherein the controller is configured to control the second RFID reader to transmit a second authorization signal to the portable electronic device when the second RFID reader receives the second response signal from the portable electronic device, the second authorization signal authorizing the at least one processor of the portable electronic device to execute a second set of operations, wherein the at least one processor of the portable electronic device is configured to execute the first set of operations when the RFID tag of the portable electronic device receives the first authorization signal, and wherein the at least one processor of the portable electronic device is configured to execute the second set of operations when the RFID tag of the portable electronic device receives the second authorization signal.

19. The system of claim 18, wherein the at least one processor of the portable electronic device is configured to execute the first set of operations while the RFID tag of the portable electronic device receives the first location signal when the portable electronic device is in the first location, and wherein the at least one processor of the portable electronic device is configured to execute the second set of operations while the RFID tag of the portable electronic device receives the second location signal when the portable electronic device is in the second location.

20. The system of claim 18, wherein the at least one processor of the portable electronic device is configured to authenticate the controller when the RFID tag receives the first authorization signal, and control the RFID tag to transmit a first authentication signal to the controller upon authenticating the controller, and wherein the at least one processor of the portable electronic device is configured to authenticate the controller when the RFID tag receives the second authorization signal, and control the RFID tag to transmit a second authentication signal to the controller upon authenticating the controller.

21. The system of claim 1, wherein the controller is configured to control the first RFID reader to transmit a first authorization signal to the portable electronic device when the first RFID reader receives the first response signal from the portable electronic device, the first authorization signal authorizing the portable electronic device to execute a first set of operations while the portable electronic device receives the first location signal, and wherein the controller is configured to control the second RFID reader to transmit a second authorization signal to the portable electronic device when the second RFID reader receives the second response signal from the portable electronic device, the second authorization signal authorizing the portable electronic device to execute a second set of operations while the portable electronic device receives the second location signal.

22. The system of claim 21, wherein the controller is configured to modify at least one of the first set of operations and the second set of operations.

23. A system for detecting direction of movement, the system comprising:

a first radio frequency identification (RFID) reader arranged in a first location, the first RFID reader being configured to transmit a first location signal from the first location, and to receive a first response signal from a portable electronic device when the portable electronic device is within range of the first location to receive the first location signal;

a second RFID reader arranged in a second location distinct from the first location, the second RFID reader being configured to transmit a second location signal from the second location, and to receive a second response signal from the portable electronic device when the portable electronic device is within range of the second location to receive the second location signal; and a controller configured to determine whether the first and second response signals received by the first and second RFID readers respectively satisfy a predetermined condition at a first time and a second time subsequent to the first time, and to determine a direction of movement of the portable electronic device relative to the first and second locations during the first and second times based on whether the first and second response signals respectively satisfy the predetermined condition at the first and second times, wherein the first RFID reader is configured to transmit the first location signal at a first frequency, and the second RFID reader is configured to transmit the second location signal at a second frequency different from the first frequency, wherein the controller is configured to control the first RFID reader to transmit a first authorization signal to the portable electronic device when the first RFID reader receives the first response signal from the portable electronic device at the first frequency, the first authorization signal authorizing the portable electronic device to execute a first set of operations while the portable electronic device receives the first location signal, and wherein the controller is configured to control the second RFID reader to transmit a second authorization signal to the portable electronic device when the second RFID reader receives the second response signal from the portable electronic device at the second frequency, the second authorization signal authorizing the portable electronic device to execute a second set of operations while the portable electronic device receives the second location signal.

24. The system of claim 23, wherein the controller is configured to control the first and second RFID readers to respectively change the first and second frequencies at a predetermined time.

25. A method of detecting direction of movement, the method comprising:

transmitting, from a first radio frequency identification (RFID) reader arranged in a first location, a first location signal from the first location;

transmitting, from a second RFID reader arranged in a second location distinct from the first location, a second location signal from the second location;

receiving, at the first RFID reader, a first response signal from a portable electronic device when the portable electronic device is within range of the first location to receive the first location signal transmitted by the first RFID reader;

receiving, at the second RFID reader, a second response signal from the portable electronic device when the portable electronic device is within range of the second location to receive the second location signal transmitted by the second RFID reader;

determining, by a hardware processor of a controller, whether the first and second response signals received by the first and second RFID readers respectively satisfy a predetermined condition at a first time and a second time subsequent to the first time; and determining, by the processor of the controller, a direction of movement of the portable electronic device relative to the first and second locations during the first and second times based on the determination of whether the first and second response signals respectively satisfy the predetermined condition at the first and second times, wherein:

upon receiving the first response signal, the first RFID reader measures power present in the first response signal received by the first RFID reader, generates a first received signal strength indicator (RSSI) signal indicating the measured power in the first response signal, and transmits the first RSSI signal to the controller when the first RFID reader receives the first response signal;

upon receiving the second response signal, the second RFID reader measures power in the second response signal received by the second RFID reader, generates a second RSSI signal indicating the measured power in the second response signal, and transmits the second RSSI signal to the controller when the second RFID reader receives the second response signal; and the processor of the controller determines an amount of power present in the first response signal based on the first RSSI signal received from the first RFID reader, and determines an amount of power present in the second response signal based on the second RSSI signal received from the second RFID reader.

26. The method of claim 25, wherein the controller includes a transceiver that receives the first response signal from the first RFID reader and receives the second response signal from the second RFID reader.

27. The method of claim 25, wherein the predetermined condition is a threshold of power present in the first and second response signals respectively received by the first and second RFID readers, and wherein the method comprises:

determining, by the processor of the controller, whether the portable electronic device is present in the first location at the first and second times based on the power present in the first response signal received by the first RFID reader at the first and second times, respectively;

determining, by the processor of the controller, whether the portable electronic device is present in the second location at the first and second times based on the power present in the second response signal received by the second RFID reader at the first and second times, respectively; and determining, by the processor of the controller, the direction of movement of the portable electronic device relative to the first and second locations by (i) comparing the respective powers present in the first and second response signals at the first time relative to the respective powers present in the first and second response signals at the second time, and (ii) determining the direction of movement of the portable electronic device relative to the first and second locations based on the comparison of the respective powers present in the first and second response signals at the first and second times.

28. The method of claim 25, wherein the predetermined condition is a threshold value of the amount of power present in the first and second response signals respectively received by the first and second RFID readers, and wherein the method comprises:

determining, by the processor of the controller, whether the portable electronic device is present in the first location at the first and second times based on the power present in the first response signal received by the first RFID reader at the first and second times, respectively; and determining, by the processor of the controller, whether the portable electronic device is present in the second location at the first and second times based on the power present in the second response signal received by the second RFID reader at the first and second times, respectively.

\* \* \* \* \*